United States Patent
Walker et al.

(10) Patent No.: US 6,553,346 B1
(45) Date of Patent: Apr. 22, 2003

(54) CONDITIONAL PURCHASE OFFER (CPO) MANAGEMENT SYSTEM FOR PACKAGES

(75) Inventors: Jay S. Walker, Ridgefield, CT (US); Daniel E. Tedesco, Stamford, CT (US); Andrew S. Vanluchene, Norwalk, CT (US); James A. Jorasch, Stamford, CT (US); T. Scott Case, Darien, CT (US)

(73) Assignee: priceline.com Incorporated, Norwalk, CT (US)

( * ) Notice: Subject to any disclaimer, the term of this patent is extended or adjusted under 35 U.S.C. 154(b) by 0 days.

(21) Appl. No.: 08/923,683

(22) Filed: Sep. 4, 1997

Related U.S. Application Data

(63) Continuation-in-part of application No. 08/889,319, filed on Jul. 8, 1997, which is a continuation-in-part of application No. 08/707,660, filed on Sep. 4, 1996.

(51) Int. Cl.[7] .............................................. G06F 17/60
(52) U.S. Cl. ................................ 705/1; 705/1; 705/38; 705/39; 705/24; 705/25; 705/26; 705/27; 380/23; 380/25; 902/22; 902/24; 902/25
(58) Field of Search ............................... 705/1, 38, 39, 705/211–27; 380/23, 25; 902/22, 24, 25

(56) References Cited

U.S. PATENT DOCUMENTS

| | | |
|---|---|---|
| 3,573,747 A | 4/1971 | Adams et al. |
| 3,581,072 A | 5/1971 | Nymeyer |

(List continued on next page.)

FOREIGN PATENT DOCUMENTS

| | | |
|---|---|---|
| EP | 512 702 A2 | 11/1992 |
| EP | 0 512 702 A2 | 11/1992 |

(List continued on next page.)

OTHER PUBLICATIONS

Wallace, Bob, "Pick a car, name your price", Computer-World, Jul. 27, 1998, v32 n30 p45–46, Dialog file 233, Accession No. 0050258, Jul. 1998.*
Koepper, Ken, "Room Inventory Auctioning: The Next CRS Generation", Lodging, Jan. 1990 at p. 26, 29–30.*

(List continued on next page.)

*Primary Examiner*—Frantzy Poinvil
(74) *Attorney, Agent, or Firm*—Morgan & Finnegan LLP

(57) ABSTRACT

A conditional purchase offer (CPO) management system for receiving and processing CPOs for packages of component goods or services. The package CPO management system preferably deconstructs an overall package CPO into component CPOs which are individually offered to sellers. If each component CPO of a given package CPO is accepted, the package CPO management system binds the buyer, on behalf of each of the accepting sellers, to purchase the entire package. An offer price for each component CPO is preferably calculated by initially determining the total market price of the package based on the market price of each individual component good or service within the package. The package CPO management system then calculates an offer price for each component CPO based on the total price offered by the buyer for the entire package (as adjusted by a reserved margin, if appropriate) multiplied by the ratio of the market price of the respective component CPO to the total market price of the package. As each individual component CPO is accepted by a seller, the package CPO management system preferably enters a "pre-bind" agreement with the seller, whereby the component good or service is reserved for a predefined time period to pen-nit the package CPO management system to complete the processing of the remaining active component CPOs. The package CPO management system preferably provides an optional agency feature that permits the package CPO management system to accept or reject a given component CPO on behalf of certain sellers who have delegated such authority to the package CPO management system.

41 Claims, 18 Drawing Sheets

U.S. PATENT DOCUMENTS

| | | | |
|---|---|---|---|
| 4,071,697 A | * | 1/1978 | Bushnell et al. |
| 4,247,759 A | | 1/1981 | Yuris et al. |
| 4,449,186 A | | 5/1984 | Kelly et al. |
| 4,553,222 A | | 11/1985 | Kurland et al. |
| 4,677,552 A | | 6/1987 | Sibley, Jr. |
| 4,751,728 A | | 6/1988 | Treat |
| 4,789,928 A | | 12/1988 | Fujisaki |
| 4,799,156 A | | 1/1989 | Shavit et al. |
| 4,903,201 A | | 2/1990 | Wagner |
| 4,931,932 A | | 6/1990 | Dalnekoff et al. |
| 5,021,953 A | | 6/1991 | Webber et al. |
| 5,101,353 A | | 3/1992 | Lupien et al. |
| 5,136,501 A | | 8/1992 | Silverman et al. |
| 5,168,446 A | * | 12/1992 | Wiseman ............... 340/825.26 |
| 5,191,523 A | | 3/1993 | Whitesage |
| 5,191,613 A | * | 3/1993 | Graziano et al. ............. 380/25 |
| 5,224,034 A | | 6/1993 | Katz et al. |
| 5,243,515 A | | 9/1993 | Lee |
| 5,253,165 A | | 10/1993 | Leiseca et al. |
| 5,262,941 A | | 11/1993 | Saladin et al. |
| 5,283,731 A | | 2/1994 | Lalonde et al. |
| 5,297,031 A | | 3/1994 | Gutterman et al. |
| 5,329,589 A | | 7/1994 | Fraser et al. |
| 5,331,546 A | | 7/1994 | Webber et al. |
| 5,361,199 A | | 11/1994 | Shoquist et al. |
| 5,375,055 A | | 12/1994 | Togher et al. |
| 5,404,291 A | | 4/1995 | Kerr et al. |
| 5,420,914 A | | 5/1995 | Blumhardt |
| 5,426,281 A | | 6/1995 | Abecassis |
| 5,444,630 A | | 8/1995 | Dlugos |
| 5,467,269 A | | 11/1995 | Flaten |
| 5,500,793 A | | 3/1996 | Deming, Jr. et al. |
| 5,517,555 A | | 5/1996 | Amadon et al. |
| 5,519,769 A | | 5/1996 | Weinberger et al. |
| 5,553,131 A | | 9/1996 | Minervino, Jr. et al. |
| 5,557,517 A | | 9/1996 | Daughterty, III |
| 5,557,518 A | * | 9/1996 | Rozen ........................ 235/379 |
| 5,570,283 A | | 10/1996 | Shoolery et al. |
| 5,592,375 A | | 1/1997 | Salmon et al. |
| 5,606,602 A | | 2/1997 | Johnson et al. |
| 5,611,052 A | | 3/1997 | Dykstra et al. |
| 5,615,269 A | | 3/1997 | Micali |
| 5,640,390 A | | 6/1997 | Sakamoto et al. |
| 5,664,115 A | | 9/1997 | Fraser |
| 5,689,652 A | | 11/1997 | Lupien et al. |
| 5,694,551 A | | 12/1997 | Doyle et al. |
| 5,696,965 A | | 12/1997 | Dedrick |
| 5,715,402 A | | 2/1998 | Popolo |
| 5,717,989 A | | 2/1998 | Tozzoli et al. |
| 5,732,400 A | | 3/1998 | Mandler et al. |
| 5,745,882 A | | 4/1998 | Bixler et al. |
| 5,757,917 A | | 5/1998 | Rose et al. |
| 5,758,328 A | | 5/1998 | Giovannoli |
| 5,758,332 A | | 5/1998 | Hirotani |
| 5,774,883 A | | 6/1998 | Andersen et al. |
| 5,794,207 A | | 8/1998 | Walker et al. |
| 5,794,219 A | | 8/1998 | Brown |
| 5,797,127 A | | 8/1998 | Walker et al. |
| 5,799,285 A | | 8/1998 | Klingman |
| 5,809,478 A | | 9/1998 | Greco et al. |
| 5,822,737 A | | 10/1998 | Ogram |
| 5,826,244 A | | 10/1998 | Huberman |
| 5,832,452 A | | 11/1998 | Schneider et al. |
| 5,835,896 A | | 11/1998 | Fisher et al. |
| 5,845,265 A | | 12/1998 | Woolston |
| 5,878,403 A | | 3/1999 | DeFrancesco et al. |

FOREIGN PATENT DOCUMENTS

| | | |
|---|---|---|
| WO | 95/16971 | 6/1995 |
| WO | 96/13013 | 5/1996 |
| WO | 96/34356 | 10/1996 |
| WO | 97/46961 | 12/1997 |
| WO | 98/10361 | 3/1998 |

OTHER PUBLICATIONS

"Bid.com 1998 Third–Quarter Revenue Increase 12.5 Percent From Second Quarter", Business Wire, Oct. 29, 1998.

Final Report: Virtual Hospital (http://www.telemed.medadmin.uiowa.edu/TRCDocs/Pubs/FinalReport/cVirtualH/virtualH/virtualh02.html), download date: Sep. 20, 1998.

"First Source Become a Member", More Reasons To Join First Source! (http://www.fsource.com/bene.html), download date: Sep. 20, 1998.

Jeffrey Davis, "Big Storm rising", Business 2.0, Sep., 1998 at p. 60.

Suite 101.com (http://www.suite101.com/doc.cfm.presskit/questions), 1998.

Web Marketing Today (http://www.wilsonweb.com/rfwilson/wmt2/issue36htm) dated Sep. 1, 1997, download date: Sep. 17, 1998.

"Free Stuff Internet Site Delivers for Viewers and Advertisers Alike", Press Release of PromoNet Interactive, Inc. dated Nov. 10, 1997.

About Iao, selected pages downloaded from www.iaoauction.com on Sep. 8, 1997 and Sep. 18, 1997.

Onsale: Auction Supersite, selected pages downloaded from www.onsale.com on Sep. 8, 1997.

Hapgood, Fred bidder Harvest, Sep. 1997, pge 58.

NASDAQ: What is NASDAQ?, selected pages downloaded from http://home.axford.com on Aug. 15, 1997.

NASDAQ Consolidated Subscriber Agreement, downloaded from www.pcquote.com/exchanges on Aug. 15, 1997.

TradingFloor: General Trading Information and Terms, downloaded from www.tradingfloor.com on Aug. 14, 1997.

HomeShark: Refinance Check, selected pages downloaded from www.homeshark.com on Aug. 13, 1997.

The Load Process, downloaded from www.sdtech.com/mls/process on Aug. 7, 1997.

Trade–Direct: We Help You Trade With Confidence, selected pages downloaded from www.trade–direct.com on Aug. 6, 1997.

Classifieds2000: The Internet Classifieds, selected pages downloaded from www.classifieds2000.com on Aug. 6, 1997.

Internet Mortgage Service Eliminates Loan Agents and Passes Commissions on to the Consumer, Company Press Release, Yahoo Business Wire (Jun. 30, 1997).

Frequently Asked Questions About: Airhitch, selected pages downloaded from www.isicom.com.fr/airhitch on May 6, 1997.

Hitch a Flight to Europe, selected pages downloaded from www.travelassist.com on May 6, 1997.

Airhitch: Your Way to Low Cost Travel, selected pages downloaded from www.vaportrails.com on May 6, 1997.

Kelsey, J. and Schneier, B., Conditional Purchase Orders, $4^{th}$ ACM Conference on Computer and Communications Security, ACM Press, 117–124 (Apr. 1997).

Bryant, Adam, "Shaking Up Air Fares' Status Quo", The New York Times, Mar. 31, 1997.

Silverman, Robert, "GM Drives Wed Ad Insertion Network", Inside Media, Feb. 26, 1997, vol. 9, No. 4, pge 1; ISSN:1046–5316.

"Flycast Introduces Unique 'Open Exchange' Match–Making Service", Interactive Marketing News, Feb. 21, 1997, vol. 4, No. 8.

"UK's World Telecom Unveils New WorldSaver Tariffs," Newsbytes, Information Access Company (Feb. 13, 1997).

"TransQuest and Web Ventures Deliver Internet Booking for Delta Air Lines", PR Newswire, Dec. 10, 1996, Financial News Section.

"Affinicast Enables Web Sites That Listen and Adapt to Customer Affinities", PR Newswire, Dec. 3, 1996.

"Web Ventures Presents BookIt!" press release printed from http://www/webventures.com/bookit/(Web Ventures World Wide Web site) on Dec. 2, 1996.

"World's First Real–Time Travel Auction Service to Be Available Via World Wide Web ETA To Open Bidding to Consumers," Business Wire, DIALOG Trade & Industry Database (Nov. 4, 1996).

Gessel, Chris, "Trade Smarter: The Limit of Orders", Investor's Business Daily, Oct. 14, 1996, p. A1.

CREST: Cruise/Ferry Revenue Management System, selected pages downloaded from www.rtscorp.com on Aug. 5, 1996.

Nishimoto, Lisa, "Travel Services Are First Online Commerce Offerings to Fly," Infoworld, Jul. 29, 1996, downloaded from http://www.infoworld.com.

About Rate Hunter, dowloaded from http://207.49.64.77/rhprodrh.htm on Jul. 14, 1996.

Cathay Pacific Online Ticket Bidding, World Internet News Digest (May 8, 1996).

Sothbey's General Information, downloaded from www.sothebys.com (1996).

CyberBid, Net Fun Ltd.(1996).

Nimmer, Raymond, T., "Electronic Contracting; Legal Issues", 14 J. Marshall J.Computer & Info L.211, Winter, 1996.

American Law Institute, Draft–Uniform Commercial Code Revised Article 2 (Sales), parts 2, 3, and 7, pp. 1–15, Jan. 4, 1996.

Speidel, Richard E. & Schott, Lee A., "Impact of Electronic Contracting on Contract Formation Under Revised UCC Article 2, Sales",C878 ALI–ABA 335, Dec. 9, 1993.

Hainer, Cathy and Grossman,Cathy Lynn, "Where Vacationing Kids Get Good Care", USA Today, Apr. 1, 1992, at p. 4D.

Del Russo, Laura, "Ticket–Bidding Firm Closes Its Door," Travel Weekly, Mar. 12, 1992.

"Newsletters", The Atlanta Constitution, Mar. 1, 1992, pge. K13.

"CRTL's Blue Ribbon Deals for 1992", Consumer Reports Travel Letter, Jan. 1992, vol. 8, No. 1, at pp. 3–5.

Traveler's Notes; Bookit Report, Consumer Reports Travel Letter, Dec. 1991 at pge. 143.

Feldman, Joan M., "To Rein In Those CRSs; Computer Reservation Systems", Air Transport World, Dec. 1991, at pge 89.

"Money Briefs; Buy Low, Fly High", Gannet News Service, Nov. 20, 1991.

"Buy Low, Fly High", USA Today, Nov. 14, 1991 at pge. 15.

Traveler's Notes; Easier Airfare Bidding, Consumer Reports Travel Letter, Oct. 1991 at pge 119.

Nelson, Janet "Practical Traveler; Airlines Relaxing Policy on No–Refund Tickets", The New York Times, Sep. 22, 1991 at pge. 3 of Section 5.

Pelline, Jeff, "New Service; Now You Can Make a Bid on Your Next Airline Ticket Home", The Orange County Register, Sep. 1, 1991 at pge. E01.

"Bookit Airfare Bidding System (Fax for Your Plane Ticket?)", Consumer Reports Travel Letter, Sep. 1991, pges. 97 & 106.

Upton, Kim "French Say Monoliths Off–limits to Visitors", Los Angeles Times, Aug. 25, 1991.

Pelline, Jeff, "Travelers Bidding on Airline Tickets; SF Firm Offers Chance for Cut–Rate Fares", San Francisco Chronicle, Section A4, Aug. 19, 1991.

Carey, Christopher, "Firm Offers Auction For Airline Tickets", St. Louis Post–Dispatch, Aug. 7, 1991 at pge 1B.

Del Rosso, Laura, "Marketel Says It Plans to Launch Air Fare 'Auction' in June", Travel Weekly, Apr. 29, 1991.

NASDAQ Adds Enhancements to SOES Limit Order File, Securities Week, Nov. 26, 1990, pge 5.

Ritter, Jeffrey B., "Scope of the Uniform Commercial Code: Computer Contracting Cases and Electrical Commercial Practices", 45 Bus. Law 2533, Aug., 1990.

Greenburg, Peter, S., "Judging DeRegulation", The Record, Jul. 22, 1990 at p. T01.

Greenburg, Peter, S., "The Savvy Traveler: Lower Air Fares for Consumers Not in the Cards; Airlines: Remember When It Cost $16 to fly From Los Angeles to San Francisco? Then You Remember the Days Before DeRegulation. Since Then, Prices Have Soared", Los Angeles Times, Jul. 8, 1990 at p. L2.

Wallace, David, "Company Planning to Let Fliers Bid on Airfares", Philadelphia Business Journal, Mar. 26, 1990 at pge 15.

"Letter to Business Extra", The San Francisco Chronicle, Dec. 26, 1989 at pge C7.

Schrage, Michael, "An Experiment in Economic Theory; Labs Testing Real Markets", The Record Section B1, Nov. 26, 1989.

Schrage, Michael Innovation/Michael Schrage: Laboratory Experiments with Market Economics, Los Angeles Times, Nov. 23, 1989 at pge. D1.

Golden, Fran "AAL's Riga Doubts Marketel's Appeal to Retailers", Travel Weekly, Nov. 13, 1989.

Del Rosso, Laura, Firm Proposes ticket–bidding system; Marketel explores electronic auction of travel; Marketel International., Travel Weekly, Section No. 91, vol. 48, p. 1; Nov. 13, 1989.

Carlsen, Clifford, "Polaris Group Set to Fly the Leveraged Sky", San Francisco Business Times, Nov. 6, 1989 at pge. 1.

Kuttner, Robert, "Computers May Turn the World into One Big Commodities Pit", Business Week, Sep. 11, 1989.

Carlsen, Clifford, "From Airline Tickets to Human Organs, the Electronic Markets Are Booming", San Francisco Business Times, Aug. 14, 1989 at pge. 17.

"Public May Submit Bids To Get Bargain Rates", Wall Street Journal, Section 2; p. 1, Col. 1; Aug. 1, 1989.

Hensley, H.G., "I'll Take Jarez," *Travel Weekly*, vol. 45, p. 7, Feb. 1986.

Gibson, R., et al., "Marketing:Fast–Food Chains Hope Diners Swallow New 'Value' Menu of Higher–Priced Items," *The Wall Street Journal*, Mar. 13, 1992, p. B1.

Anonymous, "Another Reason to Love Those Afluent Customers," *Jewelers' Circular–Keystone*, vol. CLXX, No. 7, p. 64, Jul. 1999.

American Airlines Internet Silent Auction, selected pages downloaded from www.americanair.com (date unknown).

Apollo Host Computer, selected pages downloaded from www.apollo.com (date unknown).

Cathay Pacific: CyberTraveler Auction #3—Official Rules, selected pages downloaded from www.cathaypacific.com (Jul. 30, 1996).

CyberBid, Net Fun Ltd. (1996).

Laura Del Rosso, Marketel Says It Plans to Launch Air Fare 'Auction' in June: Marketel International, Inc., Travel Weekly, Apr. 29, 1991, at 1.

Laura Del Rosso, Ticket–Bidding Firm Closes its Doors; Marketel International, Inc., Travel Weekly, Mar. 12, 1992, at 1.

Fran Golden, AAL'S Riga Doubts Marketel's Appeal to Retailers; Chris Riga of American Airlines, Travel Weekly, Nov. 13, 1989, at 4.

Robert Kuttner, Computers May Turn the World Into One Big Commodities Pit, Business Week, Sep. 11, 1989, at 17.

Lisa Nishimoto, Travel Services Are First Online Commerce Offerin gs to Fly, Infoworld, Jul. 29, 1996, downloaded from http://www.infoworld.com.

Jeff Pelline, Travelers Bidding on Airline Tickets; SF Firm Offers Chance for Cut Rate Fares, The San Francisco Chronicle, Aug. 19, 1991, (News) at A4.

Sabre Decision Technologies, selected pages downloaded from www.sabre.com (date unknown).

J. Kelsey and B. Schneier, Conditional Purchase Oders, 4th ACM Conference on Computer and Communications Security, ACM Press, 117–124 (Apr. 1997).

Michael Schrage, An Experiment In Economic Theory; Labs Testing Real Markets, The Record, Nov. 26, 1989, (Business) at B01.

The United Computer Exchange: How It All Works, selected pages downloaded from www.uce.com on Jul. 23, 1997.

World's First Real–Time Travel Auction Service to Be Available Via World Wide Web: ETA To Open Bidding to Consumers, Business Wire, DIALOG Trade & Industry Database (Nov. 4, 1996).

LANCORP Mortgage Services, http://www.lancorp–mortgage.com/retailpa.htm, 1998.

Inland Mortgage Corporation, http://inlandmortgage.com/index.htm, 1998.

The Mortgage Store, http://www.mortgagestore.com, 1998.

Golden Age Antiques and Collectibles Online Auction, http://www.goldage.com, 1997.

Moran, Susan, "Xerox Won't Duplicate Past Errors", Business Week, Sep. 29, 1997.

Coleman, Zach, "Electronic Trading System Matches Buyers, Seller", Atlanta Business Chroncile, vol. 20; No. 12; p. 37A, Aug. 22, 1997.

"What's Holding Up E–Cash?", Cybernautics Digest, vol. 3; No. 7, Finance.

Resnick, Paul et al., "Role For Electronic Brokers", http://ccs.mit.edu/CCSWP179.htm 1997.

Philatelists Online Information, http://www.506.bonsai.com/q/@131354lhyljf/infop.html, 1997.

Sports trade Information, http://www.sportstrade.com/infos.html, 1997.

Numismatists Online Information, http://www.numismatists.com/info.html, 1997.

Sell and Trade Internet Marketplace, Sell and Trade, http://sellandtrade.com/script/main.asp, 1997.

Kay, Alan, "Chapter 7 Future Research", 1997.

Trade–direct, http://www.trade–direct.com. 1997.

"Internet Mortgage Service Eliminates Loan Agents and Passes Commissions on to the Consumer", Yahoo! Finance, 1997.

Negroponte, Nicholas, "Pay Whom Per What When, Part 2", Negroponte, Issue 5.03, 1997.

"Ticketing revolution Could Triple Airline Profits, Analyst Says", Aviation Daily, vol. 325; No. 11; p. 87, 1996.

"Auctioning Unsold Airline Tickets", adapted extract from Insight (USA), The Global Ideas Bank, 1996.

Rockoff, Todd E., et al., "Design of an Internet–based system for remote Dutch auctions," Internet Research: Electronic Networking Applications and Policy, vol. 5, No. 4, pp. 10–16, 1995.

Franklin, Matthew K., et al., "The Design and Implementation of a Secure Auction Service," Proceedings: 1995 IEEE Symposium on Security and Privacy, pp. 2–14, 1995.

Tenenbaum, Jay M., et al., "CommerceNet: Spontaneous Electronic Commerce on the Internet," 1995 IEEE Spring Conference, pp. 38–43.

Sirbu, Marvin and Tygar, J.D., "NetBill: An Internet Commerce System Optimized for Network Delivered Services," IEEE 1995 Spring Conference, pp. 20–25.

Bunker, Ted, "How Auction Technology Sped And Enhanced Sale Of Radio Licenses," Investor's Business Daily, Executive Update, Regulation, p. A3, Feb. 24, 1995.

"AUCNET: The Story Continues", Harvard Business School, Jan. 17, 1995.

Anand, R., and Rao, M. Padmaja, "The Electronic Flea Market", IBM Research Division: Research Report, pp. 1–18, Jul. 28, 1994.

"Unusual Farmland Auction Set," Harrison Scott Publications, Liquidation Alert, Mar. 28, 1994.

"The Computer Museum brings auction block to cyberspace in First Internet Auction," Business Wire, Mar. 14, 1994.

Freeman, Brian and Gideon, Lidor, "Hosting Services— Linking the Information Warehouse To the Information Consumer," IEEE 1994 Spring Conference, pp. 165–171.

Booker, Ellis, "Mega real estate auction counts on imaging," Computerworld, p. 20, Dec. 7, 1992.

Abstract: "A forward/reverse auction algorithm for asymmetric assignment problems," Computational Optimization and Applications, Dec. 1992.

Abstract: "Marketel Shuts Doors," Travel Agent Magazine, Mar. 23, 1992.

Cass, Maxine, "West Coast Agents Remain Skeptical About New Air Ticket Sales Plan; Marketel: Airline ticket sales system sparks concern," Travel Agent Magazine, p. 50, Sep. 2, 1991.

Bookit!, "Airline Ticket Purchase Order For Business & Leisure Travel", Marketel International, Inc., 1991.

Inhaber, Herbert, "How To Solve the Problem of Siting Nuclear Waste," Transactions of the American Nuclear Society, vol. 62, Nov. 11–15, 1990.

Dyson, Esther, "Information, Bid and Asked," Forbes, Aug. 20, 1990.

"Mercado electronico, El chance de regatear por computador", CIENCIA Technologia E Informatica, Mar. 21, 1990 (Translation enclosed).

Cole, Jeff, "Fare bidding plan could be the ticket", St. Paul Pioneer Press Dispatch, Mar. 11, 1990.

Miller, Ross M., "The Design of Decentralized Auction Mechanisms that Coordinate Continuous Trade in Synthetic Securities," Journal of Economic Dynamics and Control, pp. 237–253, 1990.

"Business Briefing, Airline Seats May Go on the Auction Block", Insight on the news, Dec. 4, 1989.

"Business Travel Update, Automation", Travel Weekly, Nov. 27, 1989.

Munro, Don and McCann, David, "A New Way To Purchase Travel, Automated Service Would Let Companies Bid For Already–Filled Airline Seats", Business Travel News, Nov. 6, 1989.

"An Electronic Auction Ahead For Airline CRS's?", The Business Week Newsletter for Information Executives, Oct. 27, 1989.

Cohen, Danny, "Electronic Commerce," ISI Research Report, University of Southern California, Oct. 1989.

"From Airline Tickets to Human organs, the Electronic Markets are Booming", Times, vol. 3, No. 50, Aug. 14, 1989.

Coyne, Andrew, "Unbundling ideas may alter world of politics," The Financial Post (Toronto), Section 1, p. 11, Sep. 27, 1989.

Malone, Thomas W., et al., "Electronic Markets and Electronic Hierarchies," Communications of the ACM, vol. 30, No. 6, Jun. 1987.

"AUCNET: TV Auction Network System," Harvard Business School, Jul. 19, 1989.

Sammer, Harald W., "Online Stock Trading Systems: Study of an Application," IEEE 1987 Spring Conference, pp. 161–162.

Littlefair, T., "Homelink: a unique service," Computer Bulletin, pp. 12–14, Jun. 1986.

Banatre, Jean–Pierre, et al., "The Design and Building of Echere, a Distributed Electronic Marketing System," Communications of ACM, vol. 29, No. 1, Jan. 1986.

Turoff, Murray and Chinai, Sanjit, "An Electronic Information Marketplace," Elsevier Science Publishers B.V., pp. 79–90, 1985.

Banatre, Michel, "Distributed auction bidding system," IPC Business Press, Computer Communications, vol. 4, No. 4, Aug. 1981.

* cited by examiner

BUYER DATABASE 500

| BUYER ID NUMBER 520 | NAME 525 | ADDRESS 530 | CREDIT CARD ACCOUNT NUMBER 535 | CPO NUMBER(S) 540 |
|---|---|---|---|---|
| 22222 | JOHN SMITH | 3 MAIN ST. | 2222-2222-2222-2222 | P001 |
| 33333 | SUE JOHNSON | 4 PINE ST. | 3333-3333-3333-3333 | P002 |
| 44444 | DAVE McCARTHY | 6 TEMPLE ST. | 4444-4444-4444-4444 | 627 |

SELLER DATABASE 600

| SELLER ID NUMBER 635 | SELLER NAME 640 | CPO TRACKING NUMBER 645 |
|---|---|---|
| 67676 | AMERICAN AIRLINES | PC261 |
| 89898 | DELTA AIRLINES | P0627 |
| 45454 | AVIS | P2491 |
| 42929 | HERTZ | P6789 |
| 81818 | SHERATON | P9842 |
| 47474 | HILTON | P0987 |

605, 610, 615, 620, 625, 630

COMPONENT CPO DATABASE 800

| COMPONENT CPO NUMBER 840 | STATUS/PRE-BIND EXPIRATION DATE 845 | SUBJECT 850 | PRICE 855 | CONDITIONS 860 | BUYER ID NUMBER 865 |
|---|---|---|---|---|---|
| PC261 | PRE-BIND COMPLETED 8/15/97 | AIRLINE TICKETS | $360 | ROUNDTRIP NY TO ORLANDO, LEAVE 10/1, RETURN 10/7 FIRST CLASS | 22222 |
| PC262 | ACTIVE | CAR RENTAL | $226 | ORLANDO MID-SIZE 10/1- 10/7/97 | 22222 |
| PC263 | ACTIVE | HOTEL ROOM | $364 | ORLANDO NORMAL ROOM 10/1-10/7 | 22222 |
| PC275 | ACTIVE | AIRLINE TICKETS | $576 | ROUND TRIP NY TO ORLANDO, LEAVE 10/1, RETURN 10/7, FIRST CLASS | 33333 |
| PC276 | ACTIVE | CAR RENTAL | $468 | ORLANDO LUXURY 10/1-10/7 | 33333 |
| PC277 | ACTIVE | HOTEL | $756 | ORLANDO SUITE 10/1-10/7 | 33333 |

(rows labeled 805, 810, 815, 820, 825, 830)

FIG. 8

MARKET PRICE DATABASE 900

| PRODUCT 960 | QUALITY/SERVICE LEVEL 965 | TIME PERIOD 970 | MARKET PRICE 975 |
|---|---|---|---|
| ROUND TRIP AIRLINE TICKETS | FIRST CLASS | FIRST WEEK OF NOVEMBER | $420 |
| ROUND TRIP AIRLINE TICKETS | BUSINESS CLASS | FIRST WEEK OF NOVEMBER | $350 |
| ROUND TRIP AIRLINE TICKETS | COACH | FIRST WEEK OF NOVEMBER | $290 |
| CAR RENTAL | LUXURY | FIRST WEEK OF NOVEMBER | $300 |
| CAR RENTAL | MID-SIZE | FIRST WEEK OF NOVEMBER | $250 |
| CAR RENTAL | COMPACT | FIRST WEEK OF NOVEMBER | $200 |
| HOTEL | SUITE | FIRST WEEK OF NOVEMBER | $550 |
| HOTEL | NORMAL | FIRST WEEK OF NOVEMBER | $400 |
| HOTEL | ECONOMY | FIRST WEEK OF NOVEMBER | $300 |

(rows labeled 905, 910, 915, 920, 925, 930, 935, 940, 945)

SECURED AIRLINE RULES DATABASE 1000

| RULE NUMBER 1010 | ORIGINATING CITY 1012 | DESTINATION CITY 1014 | CONNECTION RESTRICTIONS 1016 | FLIGHT NUMBERS 1018 | DATE(S) OF DEPARTURE 1020 | TIME(S) OF DEPARTURE 1022 | DEPARTURE DAY OF WEEK 1024 |
|---|---|---|---|---|---|---|---|
| 45685 | NEWARK, NJ (EWR) | ORLANDO, FL (MCO) | N/A | N/A | 10/1/97-10/31/97 | N/A | TUES.-THURS. |
| 45687 | NEW YORK, NY (JFK) | CHICAGO, IL (ORD) | THRU CLEVELAND OR PITTSBURG | N/A | 4/1/97-5/31/97 | 11AM-2PM | TUES. |

| DATE(S) OF RETURN 1026 | TIMES OF RETURN 1030 | RETURN DAY OF WEEK 1032 | NUMBER OF PASSENGERS TRAVELING 1034 | LENGTH OF HAUL 1036 | YIELD ($1/MILE) 1038 | MINIMUM PRICE 1040 | INVENTORY RESTRICTIONS OR AVAILABILITY 1042 | ADVANCE PURCHASE REQUIREMENTS 1044 |
|---|---|---|---|---|---|---|---|---|
| 10/1/97-10/31/97 | N/A | TUES.-THURS. | AT LEAST 2 | N/A | N/A | $165.00 | K INVENTORY ONLY | WITHIN 21 DAYS OF FLIGHT |
| 4/1/97-5/31/97 | 11AM-2PM | MON.-THURS. | 2 | N/A | N/A | $150.00 | Q OR K INVENTORY ONLY | 7-21 DAYS PRIOR TO FLIGHT |

CONDITIONAL PURCHASE OFFER (CPO) MANAGEMENT SYSTEM FOR PACKAGES

CROSS-REFERENCE TO RELATED APPLICATIONS

This application is a continuation-in-part of U.S. patent application Ser. No. 08/889,319, filed Jul. 8, 1997, which is a continuation-in-part of U.S. patent application Ser. No. 08/707,660, filed Sep. 4, 1996, each incorporated by reference herein.

The present invention is related to the following United States patent applications filed contemporaneously herewith: "Conditional Purchase Offer Management System for Telephone Calls," U.S. patent application Ser. No. 08/923,317 (Attorney Docket No. WD2-97-028 now pending); "Conditional Purchase Offer Management System for Cruises," U.S. patent application Ser. No. 09/468,574 (Attorney Docket No. WD2-97-069 now pending); "Conditional Purchase Offer Management System for Event Tickets," U.S. patent application Ser. No. 08/923,530 (Attorney Docket No. WD2-96-081 now pending); and "Conditional Purchase Offer and Third-Party Input Management System," U.S. patent application Ser. No. 08/923,524 (Attorney Docket No. WD2-97-067 now pending), each assigned to the assignee of the present invention and incorporated by reference herein.

FIELD OF THE INVENTION

The present invention relates generally to a system for processing the sale of goods and services and, more particularly, to a system for managing the sale of packages of such goods and services by one or more sellers, such as an airline and hotel, to buyers who have submitted offers for the purchase of such a package.

BACKGROUND OF THE INVENTION

Many sellers have developed sophisticated revenue management systems (RMSs) to optimize revenue. Travel-related sellers, in particular, such as airlines, hotels, cruises and car rental agencies, rely heavily on revenue management systems to dynamically set the price for available inventory. Generally, when a flight is first added to an airline's flight schedule, for example, the airline's revenue management system attempts to maximize revenue for the flight by establishing a plurality of price classes and then allocating the number of seats and price assigned to each price class. The revenue management system thereafter continues to monitor the actual demand within each price class relative to forecasted demand, dynamically reevaluating the inventory allocation and pricing of each price class for a given flight. In this manner, the airlines attempt to fly each aircraft as full as possible without allowing earlier-booking discount-fare travelers to displace later-booking full-fare travelers. The revenue management systems of other types of travel-related sellers optimize revenue in a similar manner.

While conventional revenue management systems employ sophisticated tools to anticipate future travel needs, forecasting errors invariably lead to unanticipated excess capacity. In addition, a seller can utilize its revenue management system to forecast anticipated excess capacity, such as excess capacity on a given flight associated with seats that are predicted to be empty. Furthermore, unexpected external events, such as a price war or extreme weather conditions, can also affect a seller's excess capacity. Thus, in an attempt to reduce such excess capacity, sellers periodically reevaluate the inventory allocation and pricing. Airlines and other travel-related sellers cannot simply discount the published prices for such unsold inventory, however, without either starting a price war or compromising their own underlying price structure (i.e., without also reducing its full-fare prices for business travelers). Thus, there is currently no effective way for airlines and other travel-related sellers to dispose of such excess capacity.

Although many airlines and other travel-related sellers attempt to dispose of excess capacity with "standby" or "wait-listed" travelers, this practice is typically limited to instances where some oversight on the part of either the traveler or the seller has occurred. For example, the traveler's flight may have been overbooked, the traveler may have missed an original flight, or the traveler may have purchased a ticket on a crowded flight at or near the time of departure. Moreover, standby travel is costly for the airline and is inconvenient for the traveler because there is no guarantee that the traveler will get to fly on the same day.

In addition, many sellers, including airlines and other travel-related sellers, attempt to sell excess capacity as part of a package at a discounted price. Packages may be assembled by the respective seller of the particular goods or services included in a package, or by a third party, such as a travel agent, who assembles packages of goods or services from multiple sellers. For a travel-related package, the packages may be predefined or assembled based on buyer specifications, such as travel dates and desired classes of service. Another method used by sellers to dispose of excess capacity is through the use of third parties, known as consolidators. In the airline environment, for example, the terms of the relationship between the airlines and the consolidators are generally not flight specific and are typically defined months in advance. Thus, the sale of airline tickets through a consolidator does not provide a sufficiently dynamic mechanism for airlines to sell such excess capacity when actual demand fails to meet forecasted demand. Even assuming that airlines and other sellers could release the tickets for sale through the consolidators at the last minute, there is currently no effective way for the consolidators to announce the availability and price of such inventory to buyers.

Airlines and other travel-related sellers recognize that there is a large source of latent demand associated with leisure travelers who are willing to travel at a favorable price. There is currently no effective way, however, for such sellers to receive an offer from a buyer for leisure travel at a particular price set by the buyer, below the seller's published price. In particular, there is no effective way for the seller to be confident that if the seller accepts the buyer's offer, the buyer will travel in accordance with the offer, without using the information to ascertain the seller's underlying level of price flexibility, which, if known to a seller's competitors or buyers, could dramatically impact the seller's overall revenue structure. Furthermore, when an offer is associated with a package of goods or services, the price flexibility of each individual component good or service within the package is even further shielded from the seller's competitors or buyers.

As apparent from the above deficiencies with conventional systems for selling goods and services, such as airline tickets and other travel-related services, a need exists for a system that permits a seller to sell excess capacity when actual demand fails to meet forecasted demand. A further need exists for a buyer-driven system that permits a buyer to obtain packages of goods and services at a price set by the buyer, at a total price typically below the published price of each individual component of the package. Yet another need exists for a system that permits sellers to stimulate sales of excess inventory, without compromising the seller's published price structure. Another need exists for a system that permits sellers to capture and process consumer demand for each component item in a package, such that the selling price of each individual item cannot be determined by the buyer.

SUMMARY OF THE INVENTION

Generally, according to one aspect of the invention, a conditional purchase offer (CPO) management system is disclosed for receiving and processing CPOs from one or more buyers of packages of component goods or services. The package CPO management system preferably deconstructs an overall package CPO into component CPOs which are individually offered to sellers. The package CPO management system determines whether one or more sellers are willing to accept each of the individual components of a given package CPO. If each component CPO of a given package CPO is accepted, the package CPO management system binds the buyer, on behalf of each of the accepting sellers, to purchase the entire package.

In one embodiment, the package CPO management system reserves a margin off of the total offer price, before calculating the offer price for each component CPO. The reserved margin may be utilized, for example, to increase the offer price of one or more component CPOs that remain unaccepted by sellers. An offer price for each component CPO is calculated by initially determining the total market price of the package based on the market price of each individual component good or service within the package. The package CPO management system then calculates an offer price for each component CPO based on the total price offered by the buyer for the entire package (as adjusted by the margin, if necessary) multiplied by the ratio of the market price of the respective component CPO to the total market price of the package.

The individual component CPOs are processed to determine whether one or more sellers are willing to accept each of the individual component CPOs of the overall package CPO. The package CPO management system may filter the component CPOs provided to the various sellers, based, for example, on the industry associated with the component CPO, so that individual sellers only obtain component CPOs of interest. If each component is successfully accepted, the package CPO management system binds the buyer, on behalf of each of the accepting sellers, to purchase the entire package.

As each individual component CPO is accepted by a seller, the package CPO management system preferably enters a "pre-bind" agreement with the seller, whereby the component good or service is reserved for a predefined time period to permit the package CPO management system to complete the processing of the remaining active component CPOs. Alternatively, the package CPO management system can enter binding agreements with each seller who elects to accept a component CPO, and fund the difference to complete unaccepted components of the package before expiration at or near market prices. Component CPOs can also be provided to sellers in a particular serial order, based on the likelihood that each component of the package will bind.

According to one aspect of the present invention, the package CPO management system preferably provides an optional agency feature that permits the package CPO management system to accept or reject a given component CPO on behalf of certain agency-based sellers who have delegated such authority to the package CPO management system. Thus, the package CPO management system can preferably provide one or more component CPOs of a received package CPO to each broadcast-based seller, for the seller to independently determine whether or not to accept a given component CPO. In addition, the package CPO management system can evaluate one or more component CPOs of a received package CPO against a number of CPO rules defined by one or more agency-based sellers, to decide on behalf of an agency-based seller to accept or reject a given component CPO. A CPO rule is a set of restrictions defined by a given agency-based seller, to define a combination of such restrictions for which the seller is willing to accept a predefined minimum price.

Once the terms of the package CPO have been received by the package CPO management system, the central controller will preferably execute a package CPO posting process to deconstruct the overall package CPO into component CPOs, and thereafter (1) provide each component CPO to the appropriate broadcast-based sellers and (ii) evaluate each component CPO against the appropriate CPO rules of each appropriate agency-based seller. In addition, once the component CPOs have been posted, the package CPO management system will preferably periodically execute a package CPO monitoring process to determine if each component CPO of an overall package CPO is accepted by an appropriate seller. If each of the individual component CPOs of a given package CPO are accepted by one or more sellers, the package CPO management system notifies and binds the buyer, on behalf of each of the accepting sellers, to purchase the entire package with the appropriate restrictions which meet the conditions defined by the buyer.

A more complete understanding of the present invention, as well as further features and advantages of the present invention, will be obtained by reference to the following detailed description and drawings.

BRIEF DESCRIPTION OF THE DRAWINGS

FIG. 6 illustrates a sample table from the seller database of FIG. 2;

FIG. 8 illustrates a sample table from the component CPO database of FIG. 2;

FIG. 9 illustrates a sample table from the market price database of FIG. 2;

FIGS. 10a and 10b illustrate sample tables from the secured seller rules database of FIG. 3;

DETAILED DESCRIPTION

Figure 1:
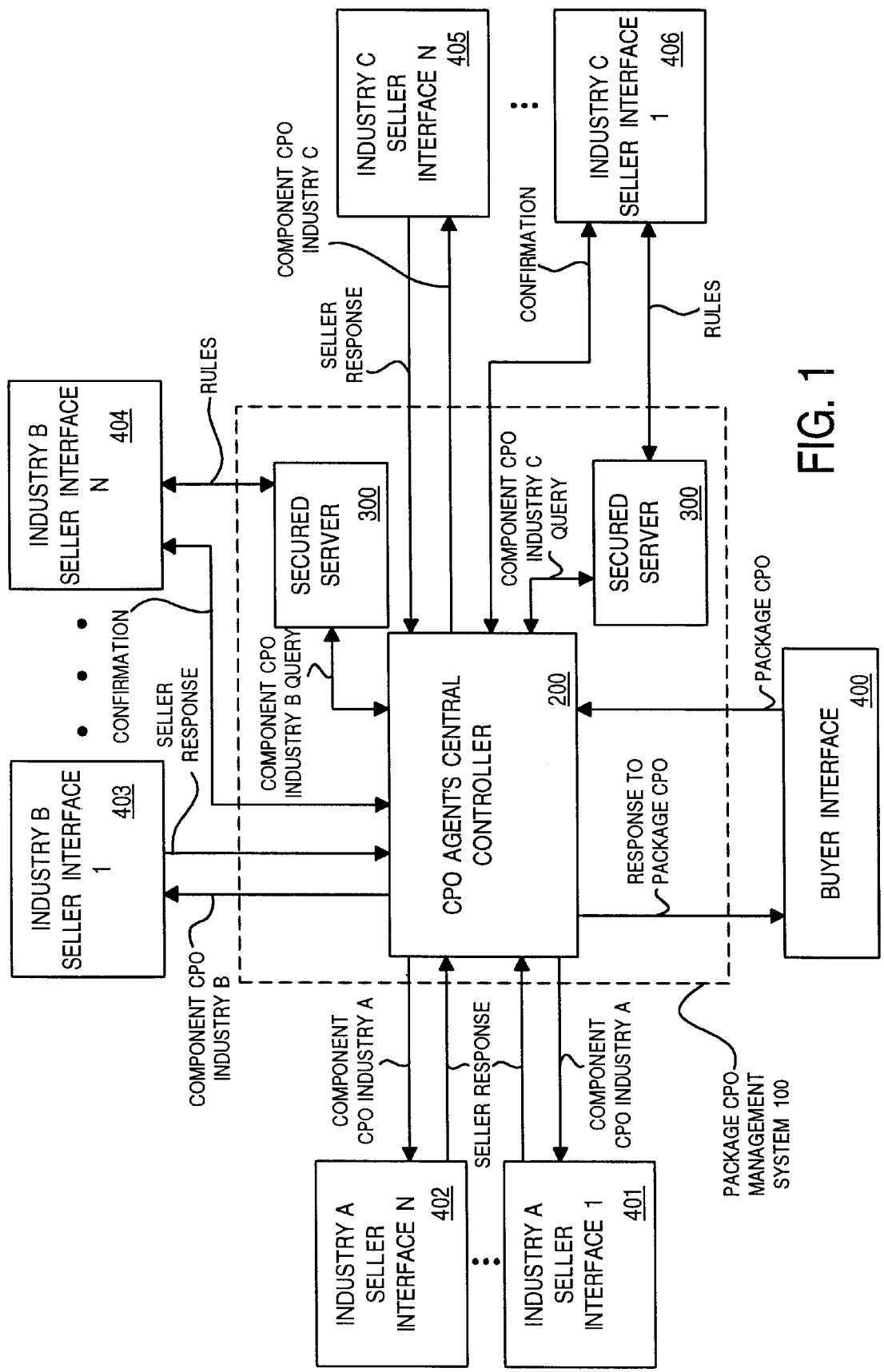
FIG. 1 is a schematic block diagram illustrating a package conditional purchase offer (CPO) management system in accordance with one embodiment of the present invention.

FIG. 1 shows a conditional purchase offer (CPO) management system for receiving and processing CPOs from one or more buyers, utilizing buyer interfaces 400, for packages of component goods or services. In one embodiment, the package CPO management system 100 deconstructs or breaks up an overall package CPO into component CPOs which are individually offered to sellers. The package CPO management system 100 processes the individual component CPOs associated with each package CPO to determine whether one or more sellers, utilizing seller interfaces 401–406, are willing to accept each of the individual components of a given package CPO. As discussed further below, if each of the individual component CPOs of a given package CPO are accepted by one or more sellers, the package CPO management system 100 binds the buyer, on behalf of each of the accepting sellers, to purchase the entire package. In this manner, a legally binding contract is formed.

As used herein, a package CPO is a binding offer containing one or more conditions submitted by a buyer for the purchase of a package of component goods or services or both, such as air travel, hotel and car rental, at a buyer-defined price. In the illustrative travel embodiment, the buyer-defined conditions for a package CPO would generally include overall price and itinerary parameters, such as the origin and destination cities; acceptable dates and times of travel; and desired class of service for each individual component. In addition, a buyer may optionally provide more detailed specifications for one or more individual components of an overall package CPO, such as whether connecting flights or stopovers are acceptable to the buyer for the airline portion of a travel-related package CPO, or a preferred provider for one or more individual component goods or services.

According to one feature of the present invention, the package CPO management system 100 preferably deconstructs an overall package CPO into component CPOs which are individually offered to sellers. In an alternate embodiment, the package CPO management system 100 provides the overall package CPO to each seller, with sellers being able to separately accept each component of the package CPO. It is noted that the individual components of a package CPO can be for identical products. For example, a buyer can submit a purchase offer for six (6) general admission tickets to a particular sporting event. The package CPO management system 100 can provide the purchase offer to sellers as an integral CPO for six tickets which may only be accepted by one seller. Alternatively, the package CPO management system 100 can deconstruct the overall package CPO for six tickets into a number of component CPOs for one or more tickets which are individually offered to sellers. In one implementation, an overall package CPO for bulk goods can be deconstructed into component CPOs which are optimized into units which are most likely to be accepted. In the above ticket example, the package CPO management system 100 can decompose the request for six tickets into three component CPOs for two tickets each, assuming that most sellers are looking to sell pairs of tickets.

In one preferred embodiment, the package CPO management system 100 reserves a margin off of the total offer price, before calculating the offer price for each component CPO. The reserved margin amount may be determined based on the likelihood that all components of the overall package will be bound. In this manner, the margins mitigate the risk incurred by the package CPO management system 100 as a result of a failure to bind all components of a package CPO.

As discussed further below in conjunction with FIG. 12, the package CPO management system 100 can utilize the reserved margin or portions thereof to increase the offer price of one or more component CPOs that remain unaccepted by sellers. For example, if a buyer were to submit an offer for a vacation package with a total cost not to exceed one thousand dollars ($1,000.00), the package CPO management system 100 may retain a one hundred dollar margin ($100), or ten percent (10%), to utilize if components of the desired package cannot be bound with the offer prices allocated from the initial $900. If, however, the package CPO management system 100 is successful in binding the entire package with the initially allocated $900, then the package CPO management system 100 can retain the $100 margin as profit, return the margin to the buyer, or place the unused margin in a fund to help bind the component CPOs of other package CPOs.

In order to calculate an offer price for each component CPO, the package CPO management system 100 preferably initially determines the total market price of the package based on the market price of each individual component good or service within the package. The package CPO management system 100 then calculates an offer price for each component CPO based on the total price offered by the buyer for the entire package, as adjusted by the reserved margin, if appropriate, multiplied by the ratio of the market price of the respective component CPO to the total market price of the package. For example, if a buyer submits an offer for a travel package consisting of air travel, hotel accommodations and a car rental, with a total cost for the package not to exceed one thousand dollars ($1,000.00), and with each component item having a market price of $420, $400 and $250, respectively, the package would have a total market price of $1070. If a $100 margin is initially retained by the package CPO management system 100, the $900 adjusted package CPO price would be allocated to the individual component CPOs as follows based on the market prices: $360 (40%) for airline tickets, $333 (37%) for hotel accommodations and $207 (23%) for car rental.

The package CPO management system 100 then processes the individual component CPOs to determine whether one or more sellers are willing to accept each of the individual component CPOs of the overall package CPO. If successful, the package CPO management system 100 binds the buyer, on behalf of each of the accepting sellers, to purchase the entire package. As discussed further below, as each individual component CPO is accepted by a seller, the package CPO management system 100 preferably enters a "pre-bind" agreement with the seller, whereby the component good or service is reserved for a predefined time period to permit the package CPO management system 100 to complete the processing of the remaining active component CPOs. A seller who accepts a component CPO may permit the package CPO management system 100, for example, a two-week period within which the package CPO management system 100 must complete the package. It is noted that such a limited predefined "pre-bind" period protects sellers from reserving a product that cannot be later sold.

In an alternate implementation, the package CPO management system 100 can enter binding agreements with each seller who elects to accept a component CPO. In this implementation, if parts of the package were bound, and others were not at the time of expiration, the package CPO management system 100 could fund the difference to complete the unaccepted components of the package at or near market prices. In a further alternate implementation, the package CPO management system 100 can provide component CPOs to sellers in a particular serial order, based on the likelihood that each component of the package will bind.

In addition, a seller can preferably be ensured that the package CPO management system 100 could not continue shopping an accepted component CPO to the seller's competitors after a pre-bind is obtained by encrypting the initial pre-bind. For example, a seller who pre-binds a given component CPO can encrypt their identifying characteristics before transmitting their acceptance to the package CPO management system 100 so that the package CPO management system 100 can identify the seller's industry, such as airline, and authorization to accept offers, but could not identify the seller's specific identity until the entire package was complete.

Although the package CPO management system 100 is illustrated herein as a system for processing travel-related package CPOs, the package CPO management system 100 could be utilized to process packages of any component goods or services or both, such as automobiles and related insurance, computers and related peripheral equipment, or bulk goods, as would be apparent to a person of ordinary skill.

Package CPO Management System

As shown in FIG. 1, the package CPO management system 100 preferably includes a central controller 200 and one or more secured servers 300, for communicating with one or more buyer or seller interfaces 400–406. The package CPO management system 100 may provide a given component CPO to selected sellers based on the industry associated with the component CPO or other predefined screening criteria, as shown in FIG. 1, so that sellers only obtain component CPOs that they may be interested in or are authorized to screen. Alternatively, the package CPO management system may provide all component CPOs to all sellers for screening.

According to one feature of the present invention, the package CPO management system 100 preferably provides an optional agency feature that permits the package CPO management system 100 to accept or reject a given component CPO on behalf of certain agency-based sellers who have delegated such authority to the package CPO management system 100. Thus, the package CPO management system 100 preferably (i) evaluates component CPOs on behalf of certain agency-based sellers who have delegated authority to the package CPO management system 100 to accept or reject a given component CPO, and (ii) permits broadcast-based sellers to evaluate component CPOs independently. Thus, the package CPO management system 100 can preferably provide one or more component CPOs of a received package CPO to each broadcast-based seller, for the seller to independently determine whether or not to accept a given component CPO. It is noted that the package CPO management system 100 can provide a component CPO to each appropriate broadcast-based seller, for example, by means of a broadcast transmission, or by means of posting the component CPO, for example, on an electronic bulletin board accessible by each broadcast-based seller. Alternatively, the package CPO management system 100 can evaluate one or more component CPOs of a received package CPO against a number of CPO rules defined by one or more agency-based sellers, to decide on behalf of an agency-based seller to accept or reject a given component CPO. Thus, the package CPO management system 100 can determine if one or more sellers accepts a given component CPO by providing the component CPO to each seller and receiving an acceptance or rejection, or by applying the component CPO to the CPO rules to render a decision to either accept, reject or counter a component CPO on behalf of a particular seller.

As discussed further below, a CPO rule is a set of restrictions defined by a given agency-based seller, such as seller 404, to define a combination of such restrictions for which the seller is willing to accept a predefined minimum price. In one embodiment, the CPO rules are generated by the revenue management system, yield management system, or profit management system of the respective agency-based seller, or by any system that controls and manages inventory. For a more detailed discussion of CPO rules, the manner in which they are generated and related security issues, see U.S. patent application Ser. No. 08/889,319, entitled Conditional Purchase Offer Management System, filed Jul. 8, 1997, the parent application to the present invention, which is incorporated by reference herein. Generally, the revenue management system, for example, will employ a CPO rules generation process to generate CPO rules by evaluating current inventory, pricing and revenue information, as well as historical patterns and external events, to forecast future travel.

For example, a CPO rule for a given agency-based airline can specify that the airline will accept any component CPO for travel between Newark, N.J. (EWR) and Orlando, Fla. (MCO) during the month of October, 1997, provided that (i) the customer travels between Tuesday and Thursday, (ii) the tickets are booked within 21 days of departure, (iii) the price is at least $165 per ticket, (iv) K-class inventory is available on all flight segments of the customer's itinerary, and (v) there are at least two (2) passengers travelling together.

As discussed further below in conjunction with FIG. 3, each secured server 300 may be associated with one or more agency-based sellers and each server 300 stores, among other things, the CPO rules defined by any associated agency-based sellers, such as sellers 404 and 406. Each secured server 300 may be remotely located from the central controller 200, as shown in FIG. 1, or may be integrated with the central controller 200. In one remote embodiment, the secured server 300 associated with each agency-based seller may be physically located at a processing facility secured by the particular seller, or at the physical location of a third party.

As discussed further below, each buyer contacts the package CPO management system 100, for example, by means of telephone, facsimile, online access, e-mail, in-person contact or through an agent, and provides the package CPO management system 100 with the terms of their package CPO. It is noted that each buyer may employ a general-purpose computer, such as the buyer interface 400, discussed below in conjunction with FIG. 4, for communicating with the package CPO management system 100. The general-purpose computer of each buyer is preferably comprised of a processing unit, a modem, memory means in and any software required to communicate with the package CPO management system 100.

Once the terms of the package CPO have been received by the package CPO management system 100, the central controller 200 will execute a package CPO posting process 1100, discussed below in conjunction with FIGS. 11a through 11c, to deconstruct the overall package CPO into component CPOs, and thereafter (i) provide each component CPO to the appropriate broadcast-based sellers and (ii) evaluate each component CPO against the appropriate CPO rules of each appropriate agency-based seller. In addition, once the component CPOs have been posted, the package CPO management system 100 will preferably periodically execute a package CPO monitoring process 1200, discussed further below in conjunction with FIGS. 12a through 12c, to determine if each component CPO of an overall package CPO is accepted by an appropriate seller. If each of the individual component CPOs of a given package CPO are accepted by one or more sellers, the package CPO management system 100 notifies the buyer, on behalf of each of the accepting sellers, that he has been bound to purchase the entire package with the appropriate restrictions which meet the conditions defined by the buyer.

The package CPO management system 100 and buyer and seller interfaces 400–406 (collectively, the "nodes") preferably transmit digitally encoded data and other information between one another. The communication links between the nodes preferably comprise a cable, fiber or wireless link on which electronic signals can propagate. For example, each node may be connected via an Internet connection using a public switched telephone network (PSTN), such as those provided by a local or regional telephone operating company. Alternatively, each node may be connected by dedicated data lines, cellular, Personal Communication Systems ("PCS"), microwave, or satellite networks.

Figure 2:
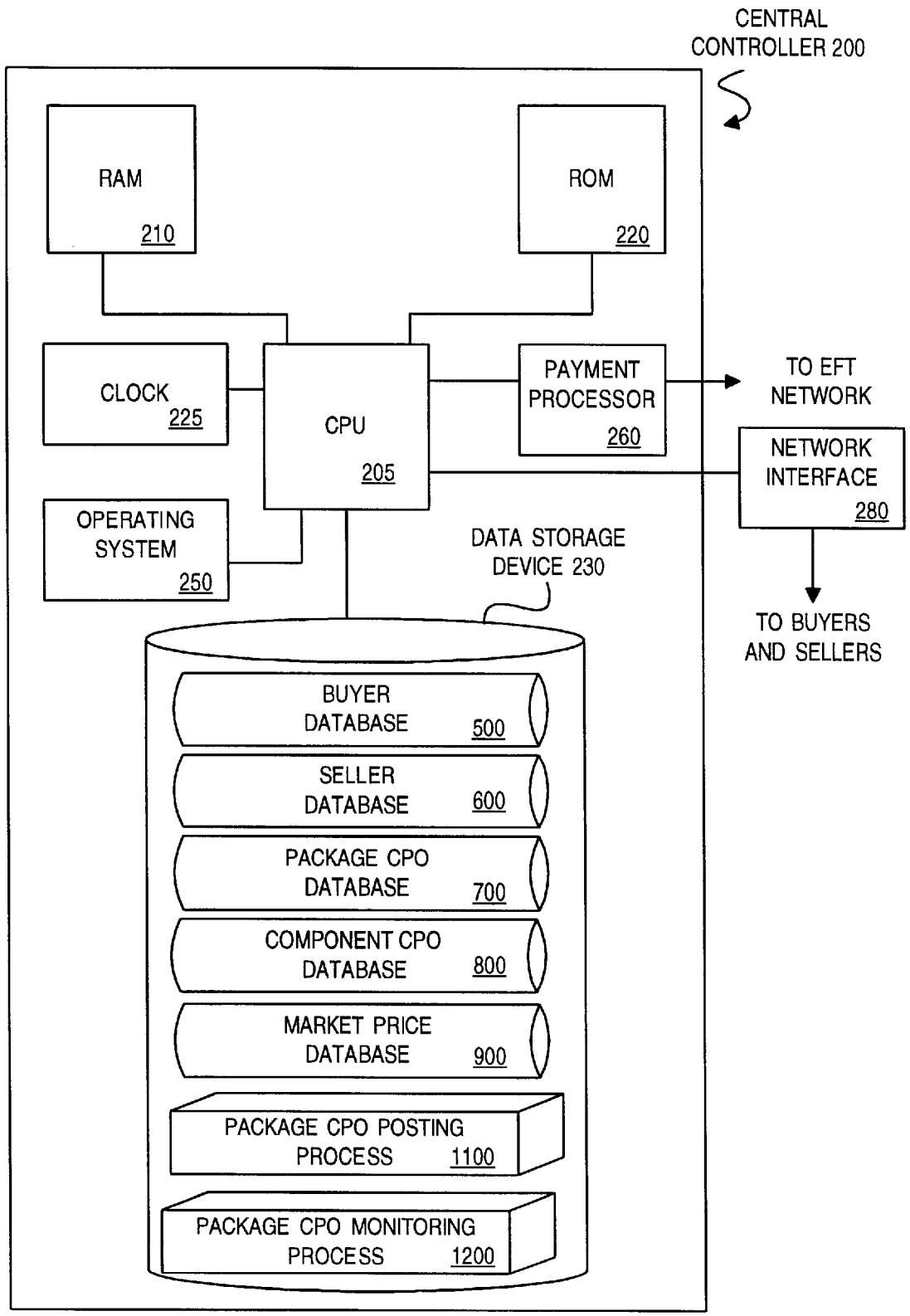
FIG. 2 is a schematic block diagram of the exemplary central controller of FIG. 1.

FIG. 2 is a block diagram showing the architecture of an illustrative central controller 200, The central controller 200 preferably includes certain standard hardware components, such as a central processing unit (CPU) 205, a random access memory (RAM) 210, a read only memory (ROM) 220, a clock 225, a data storage device 230, an operating system 250, a payment processor 260 and a network interface 280. The CPU 205 is preferably linked to each of the other listed elements, either by means of a shared data bus, or dedicated connections, as shown in FIG. 2.

The CPU 205 may be embodied as a single commercially available processor, such as Intel's Pentium 100 MHz P54C microprocessor, Motorola's 120 MHz PowerPC 604 microprocessor or Sun Microsystem's 166 MHz UltraSPARC-1 microprocessor. Alternatively, the CPU 205 may be embodied as a number of such processors operating in parallel.

The ROM 220 and/or data storage device 230 are operable to store one or more instructions, discussed further below in conjunction with FIGS. 11 and 12, which the CPU 205 is operable to retrieve, interpret and execute. The payment processor 260 preferably implements known processes to accomplish the transfer of required payments, charges and debits, between the sellers and buyers, by means of a conventional electronic funds transfer (EFF) network. In particular, as discussed below in conjunction with FIG. 12, the package CPO monitoring process 1200 preferably transmits the credit card information associated with a given buyer to the credit card issuer for payment, if a package is actually purchased by the buyer. The processing of such accounting transactions are preferably secured in a conventional manner, for example, using well-known cryptographic techniques.

The CPU 205 preferably includes a control unit, an arithmetic logic unit (ALU), and a CPU local memory storage device, such as, for example, a stackable cache or a plurality of registers, in a known manner. The control unit is operable to retrieve instructions from the data storage device 230 or ROM 220. The ALU is operable to perform a plurality of operations needed to carry out instructions. The CPU local memory storage device is operable to provide high-speed storage used for storing temporary results and control information.

As discussed further below in conjunction with FIGS. 5 through 9, respectively, the data storage device 230 includes a buyer database 500, a seller database 600, a package CPO database 700, a component CPO database 800 and a market price database 900. The buyer database 500 preferably stores information on each buyer of the package CPO management system 100, including biographical information and billing information, such as a credit card number. The seller database 600 preferably stores information on each seller which is registered with the package CPO management system 100 to sell component goods or services to package CPO buyers, including identifier and name information. The package CPO database 700 preferably contains a record of each package CPO being processed by the package CPO management system 100, including an indication of the component CPOs within each package CPO and the associated status. The component CPO database 800 preferably contains a record of each component CPO being processed by the package CPO management system 100, including the terms of each component CPO and the associated status. Finally, the market price database 900 preferably stores market price information for each component good or service processed by the package CPO management system 100.

In addition, the data storage device 230 includes a package CPO posting process 1100 and a package CPO monitoring process 1200, discussed further below in conjunction with FIGS. 11 and 12, respectively. Generally, the package CPO posting process 1100 deconstructs the package CPO into component goods or services, and thereafter (i) posts each component CPO to the appropriate broadcast-based sellers and (ii) evaluates each component CPO against the appropriate CPO rules of each agency-based seller. The package CPO monitoring process 1200 determines if each component CPO of a posted package CPO is accepted by an appropriate seller and, if accepted, provides buyer information to each accepting seller. In this manner, if each of the individual component CPOs of a given package CPO are accepted, the package CPO management system 100 notifies the buyer, on behalf of each of the accepting sellers, that he has been bound to purchase the entire package.

The network interface 280 connects the central controller 200 to the buyer and sellers, for example, by means of an Internet connection using the public switched telephone network (PSTN). The network interface 280 preferably includes multiple communication channels for simultaneously establishing a plurality of connections.

Figure 3:
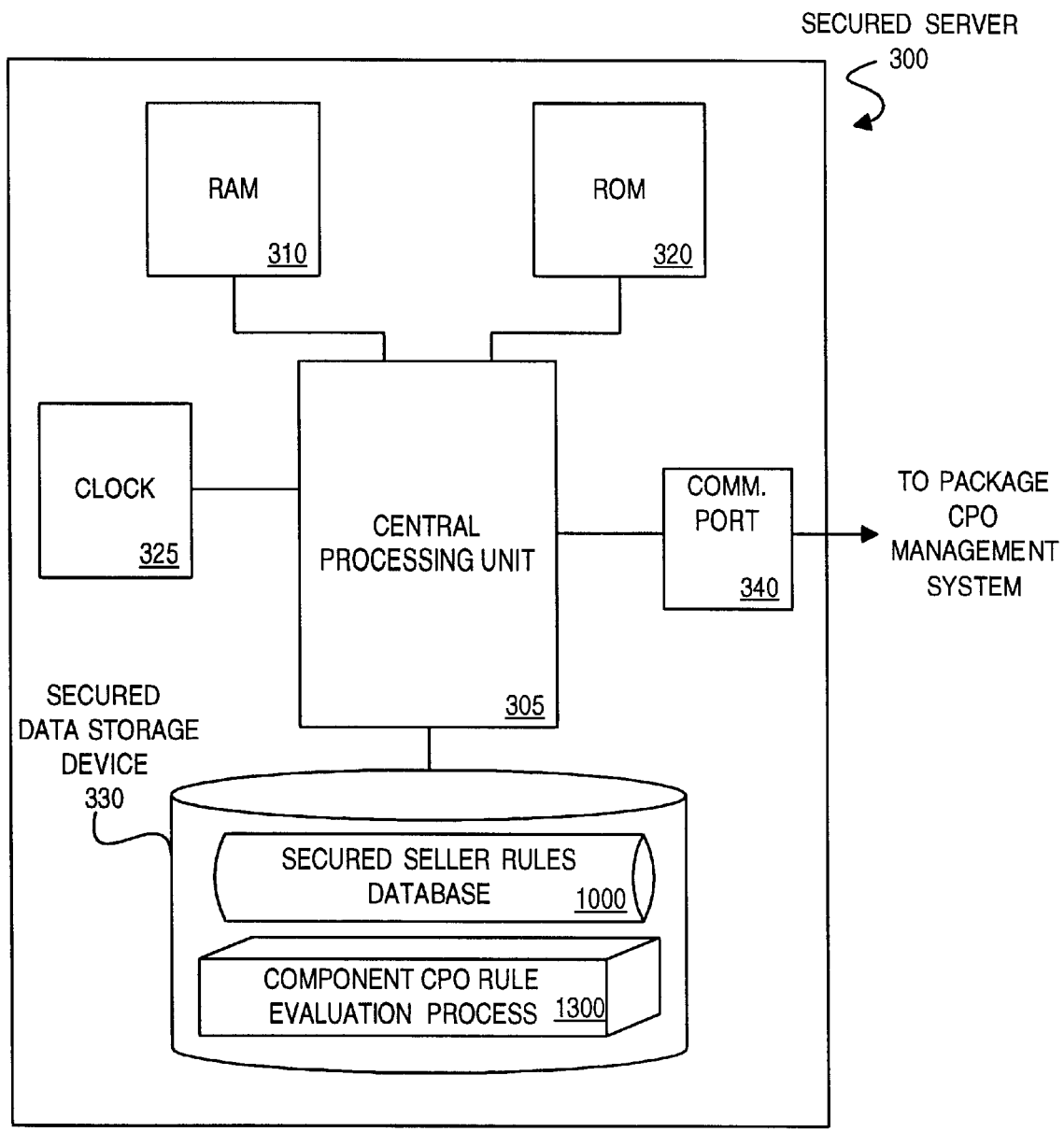
FIG. 3 is a schematic block diagram of the exemplary secured server of FIG. 1.

FIG. 3 is a block diagram showing the architecture of an illustrative secured server 300. As previously indicated, the package CPO management system 100 may utilize one or more secured servers 300, each supporting one or more agency-based sellers 404, 406. Each secured server 300 preferably includes certain standard hardware components, such as a central processing unit (CPU) 305, a random access memory (RAM) 310, a read only memory (ROM) 320, a clock 325, a data storage device 330, and a communications port 340. Each of these components may be identical to those described above in conjunction with FIG. 2.

As previously indicated, in one embodiment, the CPO rules may be stored in a secure database to maintain the integrity and confidentiality of the highly sensitive information included in each CPO rule. Thus, the secured server 300 preferably uses a secure database, such as the products commercially available from Oracle, Informix or IBM.

As discussed further below in conjunction with FIG. 10, the data storage device 330 includes a secured seller rules database 1000. The secured seller rules database 1000 preferably maintains the CPO rules for the one or more agency-based sellers associated with the secured server 300. As previously indicated, the secured seller rules database 1000 may be stored in an encrypted format to maintain the integrity and confidentiality of the highly sensitive information included in the CPO rules. In addition, the data storage device 330 includes a component CPO rule evaluation process 1300, discussed further below in conjunction with FIG. 13. Generally, the component CPO rule evaluation process 1300 is a subroutine executed by the package CPO posting process 1100, which receives a component CPO and compares the CPO against the rules of one or more agency-based sellers to generate a response on behalf of the sellers to the given component CPO.

The secured server 300 may optionally maintain an audit trail for each component CPO that is processed by the package CPO management system 100. For a discussion of a suitable audit system, see the parent application to the present invention, incorporated by reference herein above.

The communications port 340 connects the secured server 300 to the central controller 200. The communications port 340 preferably includes multiple communication channels for simultaneously establishing a plurality of connections.

Figure 4:
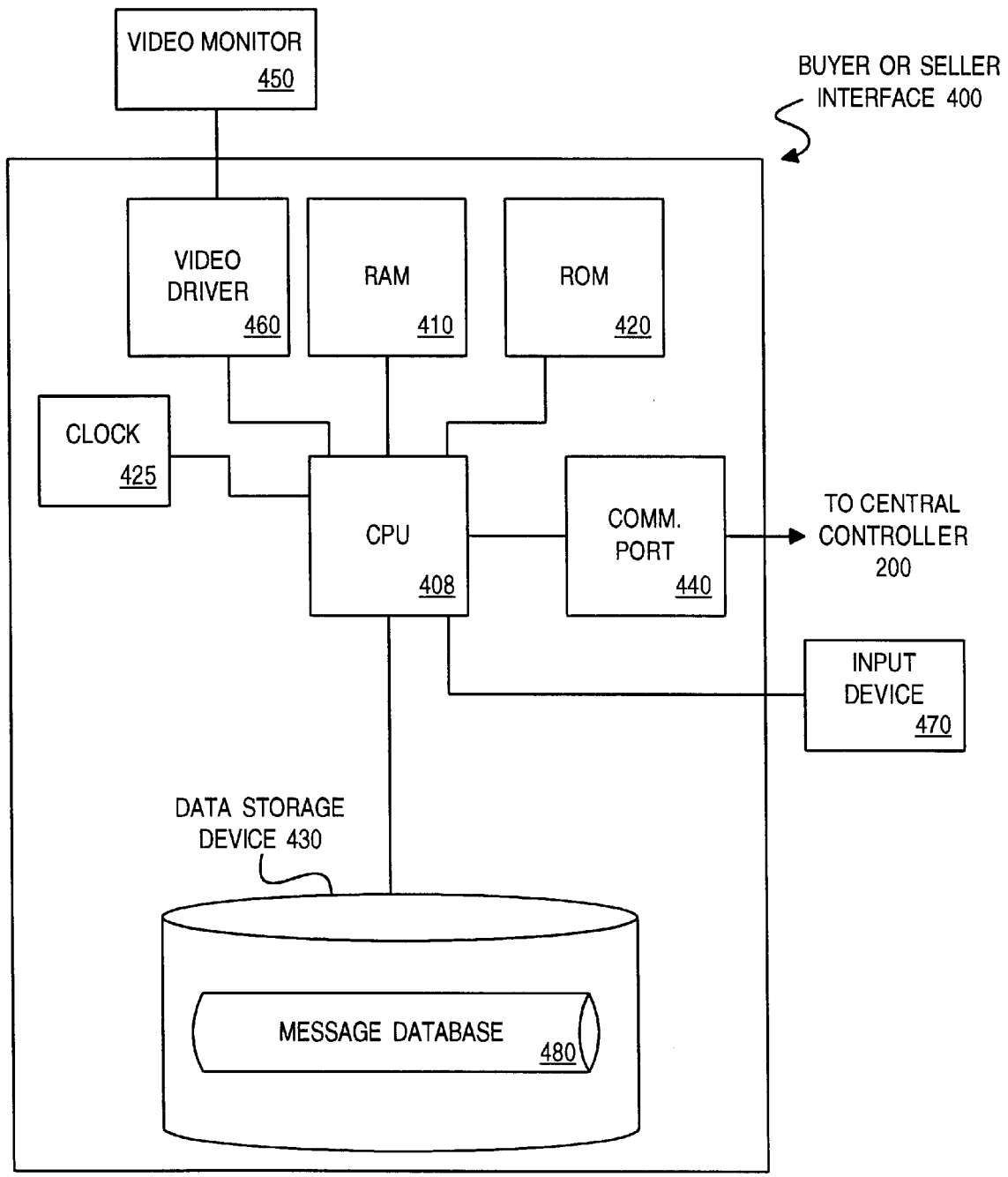
FIG. 4 is a schematic block diagram of an exemplary buyer or seller interface of FIG. 1.

FIG. 4 is a block diagram showing the architecture of an illustrative buyer or seller interface 400–406. The interface 400 preferably includes certain standard hardware components, such as a central processing unit (CPU) 408, a random access memory (RAM) 410, a read only memory (ROM) 420, a clock 425, a data storage device 430, and a communications port 440. Each of these components may be identical to those described above in conjunction with FIG. 2. In addition, the interface 400 preferably includes a video monitor 450 and related video driver 460, and an input device 470, such as a keyboard or mouse The data storage device 430 preferably includes a message database 480 for storing messages required by the respective buyer or seller interface 400–406 to communicate with the central controller 200 of the package CPO management system 100. The communications port 440 connects the interface 400 to the central controller 200 or the secured server 300, for broadcast-based and agency-based sellers, respectively.

Figure 5:
FIG. 5 illustrates a sample table from the buyer database of FIG. 2.

FIG. 5 illustrates an exemplary buyer database 500 that preferably stores information on each buyer of the package CPO management system 100, including biographical information and billing information, such as a credit card number. The buyer database 500 maintains a plurality of records, such as records 505–515, each associated with a different buyer. For each buyer identifier in field 520, the buyer database 500 includes the corresponding buyer name and address in fields 525 and 530, respectively, and credit card number in field 535. In addition, the buyer database 500 preferably includes an indication of the CPOs associated with the buyer in field 540, which may be package CPOs as described herein or general CPOs as described in the parent application to the present invention. The identifier stored in field 520 may be utilized, for example, to index a historical database (not shown) of previous purchases and CPOs associated with the buyer.

FIG. 6 illustrates an exemplary seller database 600 which preferably stores information on each seller which is registered with the package CPO management system 100 to sell component goods or services to package CPO buyers, including identifier and name information. The seller database 600 maintains a plurality of records, such as records 605–630, each associated with a different seller. For each seller identifier listed in field 635, the seller database 600 includes the corresponding seller name in field 640. In addition, the seller database 600 preferably records a tracking number in field 645 for any CPOs associated with each seller. It is noted that the information recorded in field 645 could be similarly recorded by including a seller ID field in the package CPO database 700, discussed below.

Figure 7:
FIG. 7 illustrates a sample table from the package CPO database of FIG. 2.

FIG. 7 illustrates a package CPO database 700 which preferably contains a record of each package CPO being processed by the package CPO management system 100, including an indication of the component CPOs within each package CPO and the associated status. The package CPO database 700 maintains a plurality of records, such as records 705–710, each associated with a different package CPO. For each package CPO listed in field 720, the package CPO database 700 includes the status and original offer price in fields 725 and 730, respectively. In addition, the package CPO database 700 preferably records the margin factor, remaining margin, adjusted package CPO price and per-allocation-margin percentage in fields 735 through 750, respectively. The manner in which the margin variables are processed by the package CPO management system 100 are discussed below in conjunction with FIG. 12. The posting and expiration dates of the package CPO, as well as the total posting duration period and posting time required for each margin allocation are stored in fields 755 through 770, respectively. The individual component goods or services within each package CPO are optionally identified in field 775, and the conditions and component numbers associated with each component are set forth in fields 780 and 785. It is noted that the information recorded in fields 775 and 780 could alternatively be retrieved from the component CPO database 800 using the component CPO numbers recorded in field 785. Finally, an identifier of the buyer associated with each package CPO is preferably recorded in field 790.

FIG. 8 illustrates an exemplary component CPO database 800 which preferably contains a record for each component CPO being processed by the package CPO management system 100, including the terms of the component CPO and the associated status. The component CPO database 800 maintains a plurality of records, such as records 805 through 830, each associated with a different component CPO being processed by the system 100. For each component CPO identified by component CPO number in field 840, the component CPO database 800 includes the status or expiration date for pre-bound component CPOs in field 845, as well as the corresponding subject, price and conditions associated with the component CPO in fields 850 through 860, respectively. Finally, an identifier of the buyer associated with each component CPO is preferably recorded in field 865.

FIG. 9 illustrates an exemplary market price database 900 that preferably stores market price information for each component good or service processed by the package CPO management system 100. As discussed further below in conjunction with FIG. 11, the package CPO posting process 1100 preferably utilizes the market price information to allocate the overall package price to each component good or service. The market price database 900 maintains a plurality of records, such as records 905 through 945, each associated with a different component good or service processed by the system 100. For each component good or service identified in field 960, the market price database 900 identifies the available quality or service levels for each good or service in field 965, as well as the corresponding market price set forth in field 975, for each time period indicated in field 970. It is noted that the market price for each service level of round trip airline travel is preferably recorded for each originating and destination city pair (O & D Pair).

As previously indicated, the secured server 300 preferably maintains one or more secured seller rules databases 1000 to store the CPO rules for the one or more agency-based sellers associated with the secured server 300. An example of a secured seller rules database 1000 is shown in FIG. 10a for an agency-based airline and in FIG. 10b for an agency-based hotel.

FIG. 10a illustrates an exemplary secured airline rules database 1000 which preferably maintains the CPO rules for one or more agency-based airlines associated with a particular secured server 300. As previously indicated, the secured airline rules database 1000 may be stored in an encrypted format to maintain the integrity and confidentiality of the highly sensitive information included in the CPO rules. The secured airline rules database 1000 maintains a plurality of records, such as records 1002 and 1004, each associated with a different CPO rule. For each CPO rule identified by rule number in field 1010, the secured airline rules database 1000 includes the associated restrictions defined by the respective agency-based airline in fields 1012 through 1044.

Figure 10B:

FIG. 10b illustrates an exemplary secured hotel rules database 1050 which preferably maintains the CPO rules for one or more agency-based hotels associated with a particular secured server 300. As previously indicated, the secured hotel rules database 1050 may be stored in an encrypted format to maintain the integrity and confidentiality of the highly sensitive information included in the CPO rules. The secured hotel rules database 1050 maintains a plurality of records, such as records 1052 through 1056, each associated with a different CPO rule. For each CPO rule identified by rule number in field 1060, the secured hotel rules database 1050 identifies the applicable hotel sites in field 1065 and includes the associated restrictions defined by the respective agency-based hotel in fields 1070 through 1090.

Figure 11A:
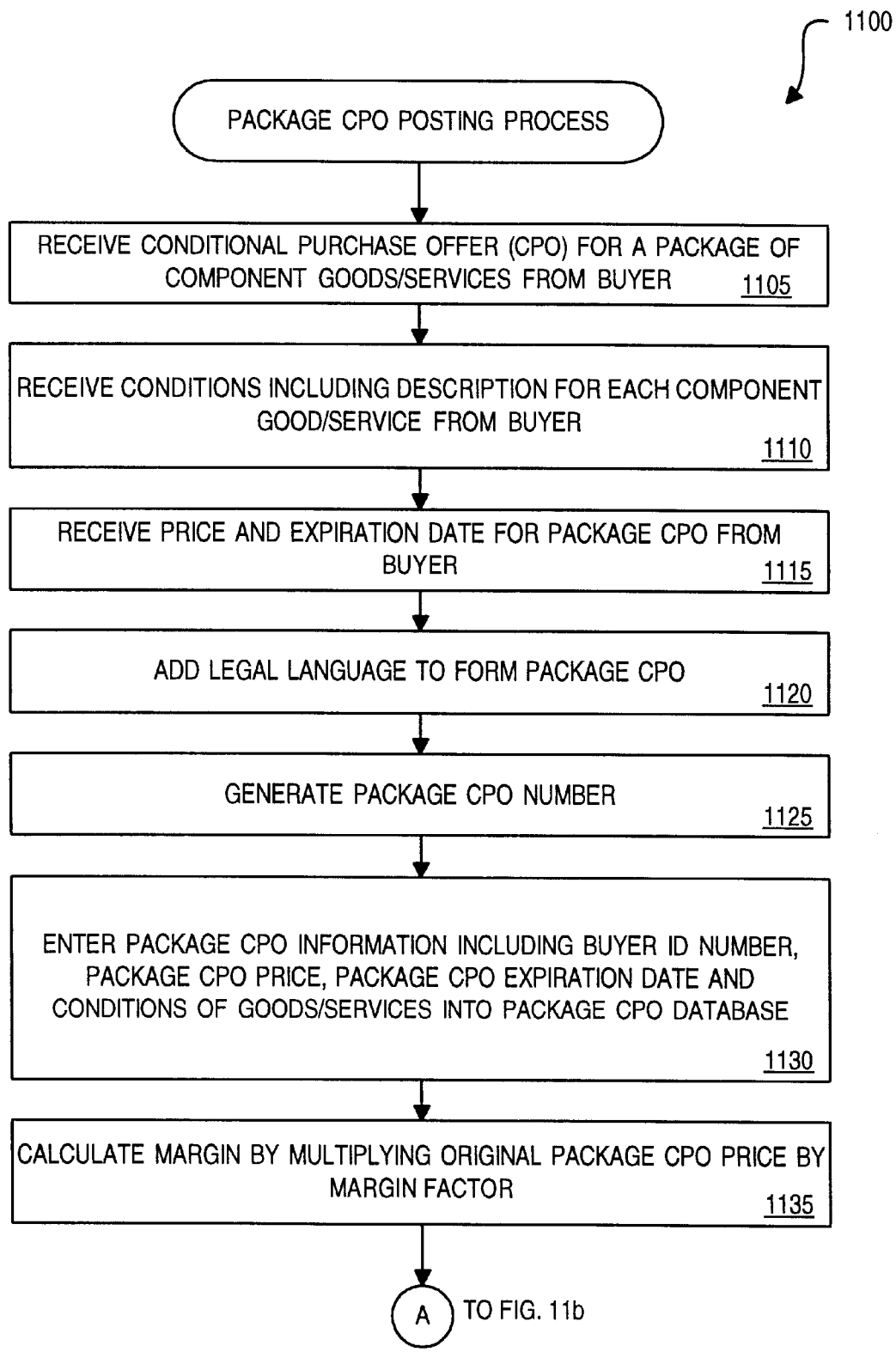
FIGS. 11a through 11c, collectively, are a flow chart describing an exemplary package CPO posting process implemented by the central controller of FIG. 2.
Figure 11B:
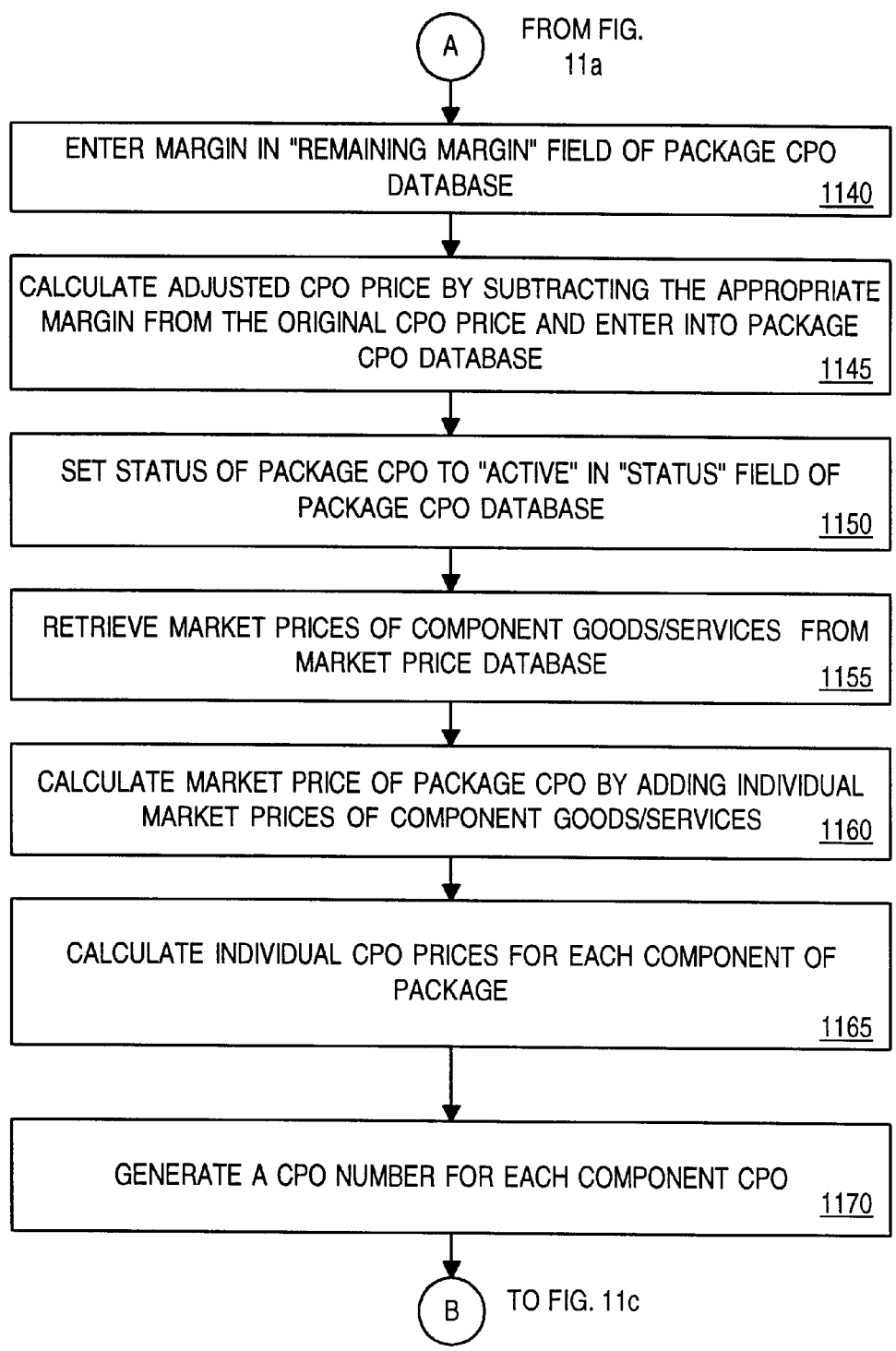
Figure 11C:
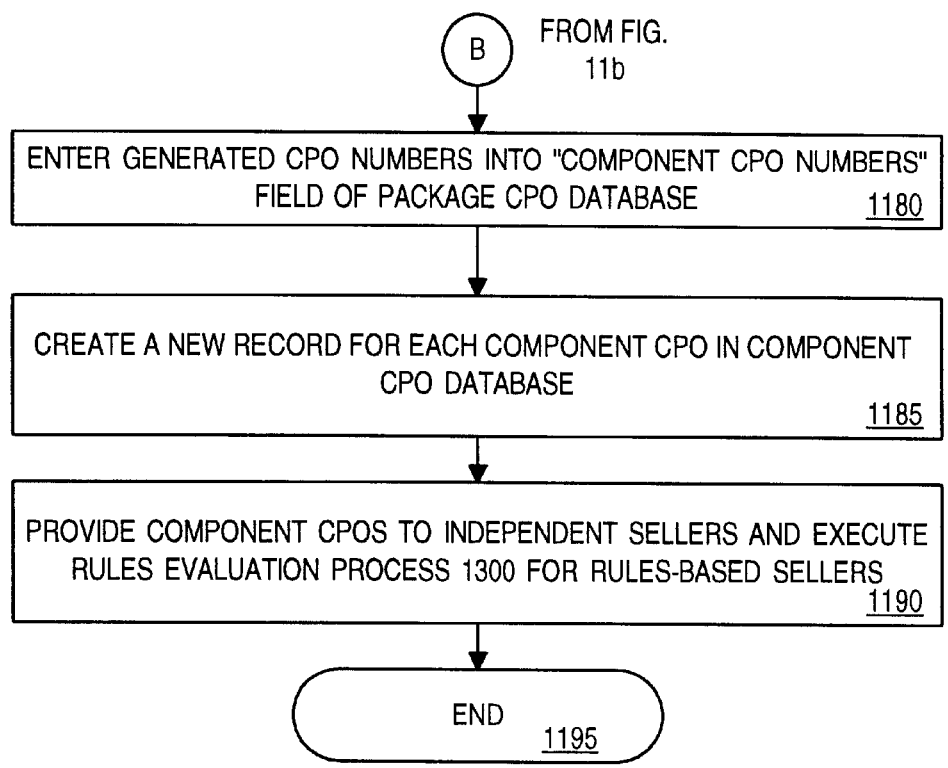

As discussed above, the central controller 200 preferably executes a package CPO posting process 1100, shown in FIGS. 11a through 11c, to deconstruct the package CPO into component goods or services, and thereafter (i) post each component CPO to the appropriate broadcast-based sellers and (ii) evaluate each component CPO against the appropriate CPO rules of each agency-based seller. As illustrated in FIG. 11a, the package CPO posting process 1100 begins the processes embodying the principles of the present invention during step 1105, when a buyer submits a CPO for a package of component goods or services.

Thereafter, the central controller 200 will receive the conditions associated with the package CPO from the buyer, including a description of each component good or service, and an identifier of a general purpose account, such as a credit or debit card account from which funds may be paid during step 1110, and then receive the price and expiration date for the package CPO from the buyer during step 1115. In this manner, the offer is guaranteed with a general purpose account, for example, using a line of credit on a credit card account. Appropriate legal language is preferably displayed or read to the buyer during step 1120 to form a binding package CPO. A package CPO number is generated during step 1125, and the package CPO information, including the buyer identifier, package CPO price and expiration date, and conditions for the component goods or services, is then entered into the package CPO database 700 during step 1130.

As previously indicated, the package CPO management system 100 preferably reserves a margin off of the total package offer price, before calculating the offer price for each component CPO. Thus, an appropriate margin is calculated during step 1135 by multiplying the package CPO price by the margin factor recorded in the package CPO database 700. Thereafter, the calculated margin is recorded in the "remaining margin" field 740 of the package CPO database 700 during step 1140 (FIG. 11b). The adjusted CPO price is then calculated by subtracting the calculated margin from the original total package offer price, which is then entered into the package CPO database 700 during step 1145. The status of the package CPO is set to "active" in field 725 of the package CPO database 700 during step 1150.

The market price of each component good or service in the package CPO is retrieved during step 1155 from the market price database 900. The market price of the overall package CPO is calculated during step 1160 by adding the market price of each individual component CPO in the overall package. The individual CPO prices for each component CPO are then calculated during step 1165, for example, by allocating the adjusted package CPO price, as calculated during step 1145, in accordance with the ratio of the market price of the respective component good or service to the total market price.

A CPO number is then generated for each component CPO during step 1170 and recorded in the "component CPO numbers" field of the package CPO database 700 during step 1175 (FIG. 11c). A new record is created in the component CPO database 800 for each component CPO during step 1180, before each component CPO is provided to each broadcast-based seller and the component CPO rule evaluation process 1300 is executed for each agency-based seller during step 1190. Program control terminates during step 1195.

Figure 12A:
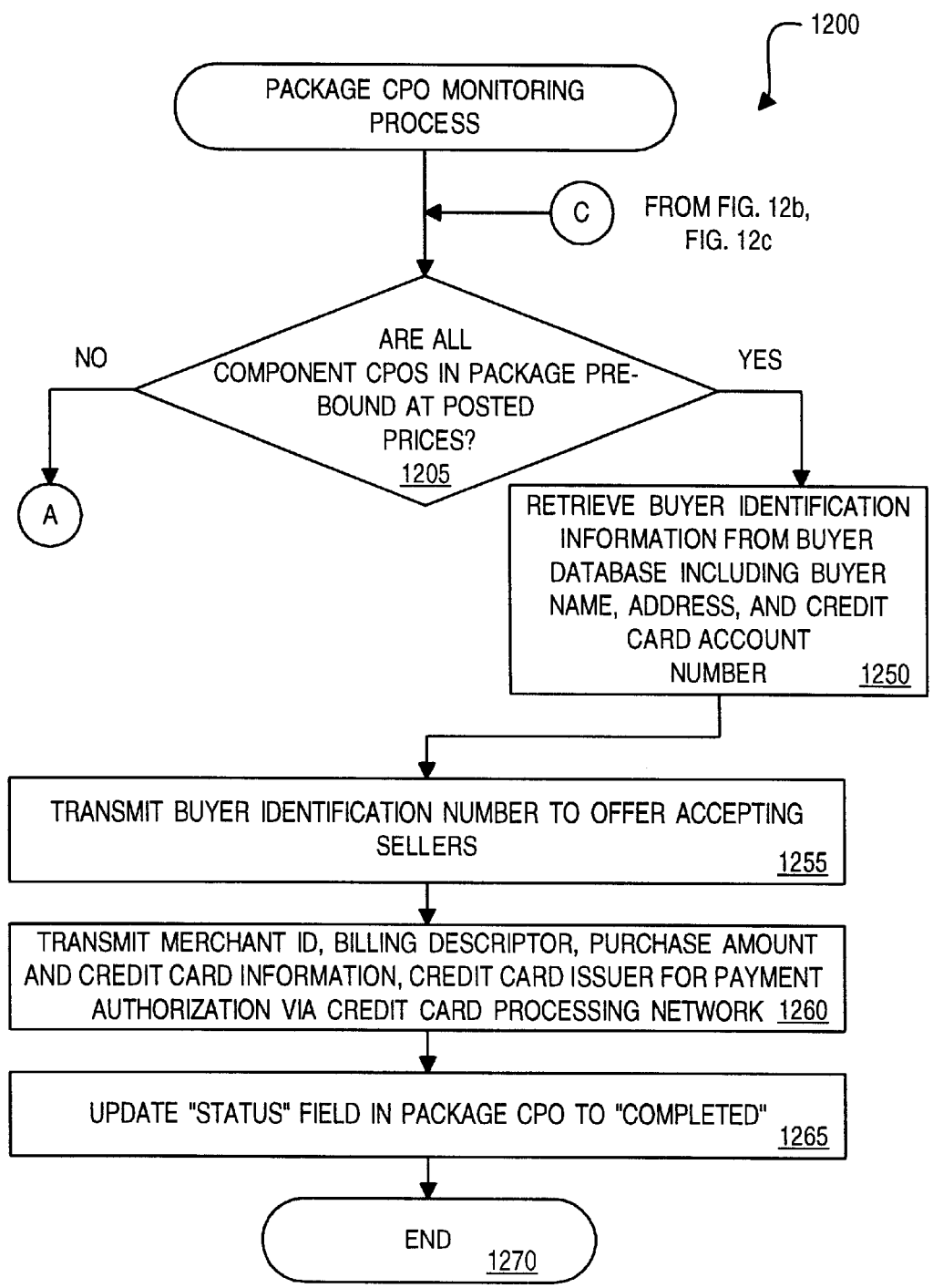
FIGS. 12a through 12c, collectively, are a flowchart describing an exemplary package CPO monitoring process implemented by the central controller of FIG. 2.
Figure 12B:
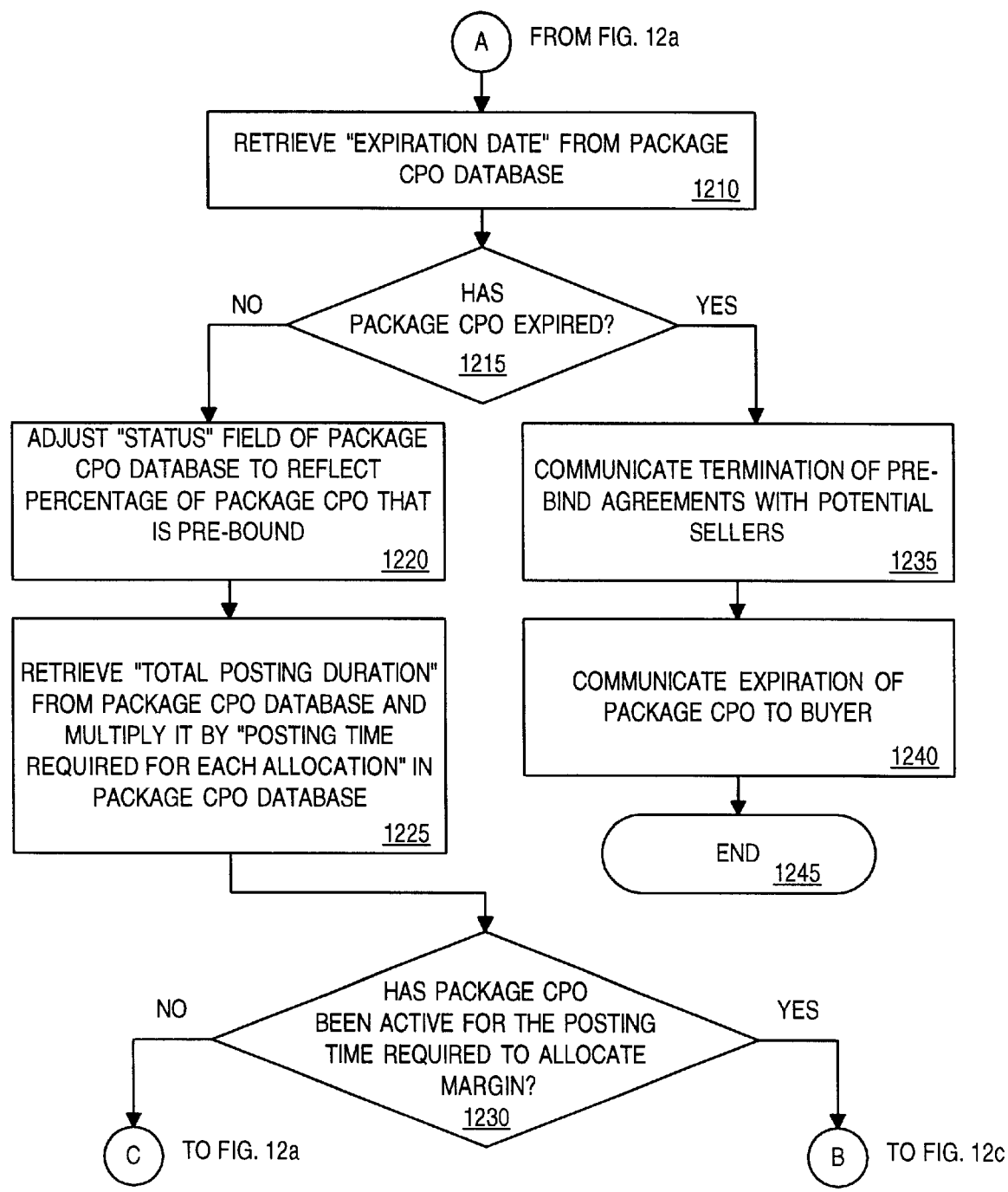
Figure 12C:
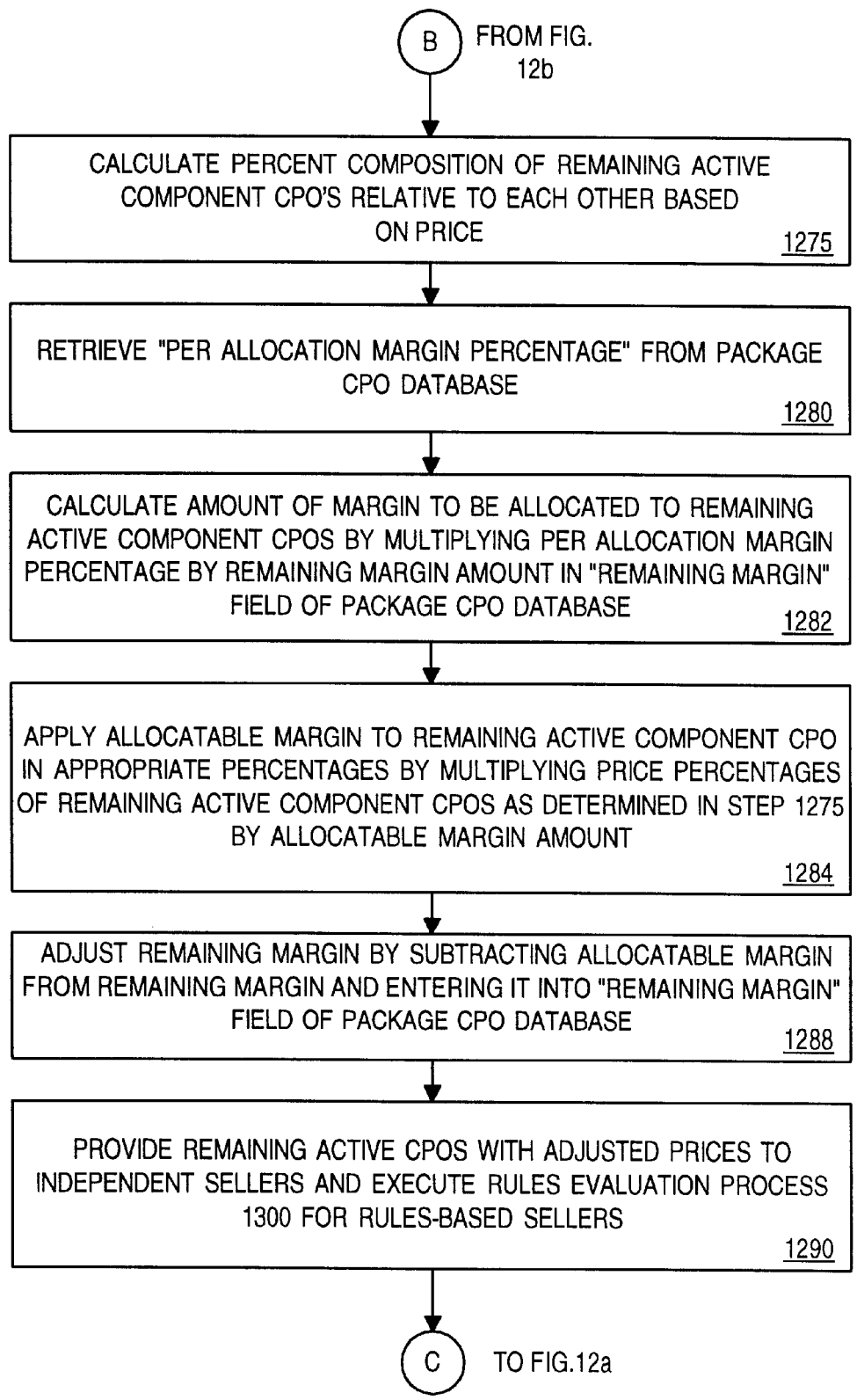

As discussed above, the central controller 200 preferably executes a package CPO monitoring process 1200, shown in FIGS. 12a through 12c, to determine if each component CPO of a posted package CPO has been accepted by an appropriate seller and, if accepted, provides buyer information to each accepting seller. In this manner, if each of the individual component CPOs of a given package CPO are accepted, the package CPO management system 100 notifies and binds the buyer, on behalf of each of the accepting sellers, to purchase the entire package. The package CPO monitoring process 1200 may be periodically executed to determine the status of each component CPO, or executed continuously.

As illustrated in FIG. 12a, the package CPO monitoring process 1200 begins the processes embodying the principles of the present invention during step 1205, by performing a test to determine if all of the component CPOs within a given package CPO have been prebound at currently posted prices. It is noted that in the illustrative embodiment, the first seller to accept a given component CPO is awarded the component CPO. For a discussion of other mechanisms for determining which seller among a plurality of accepting sellers should be awarded a component CPO, see the parent application to the present invention, incorporated by reference herein above. If it is determined during step 1205 that all of the component CPOs within a given package CPO have been pre-bound at currently posted prices, then buyer identification information, including the buyer's name, address and credit card account number, is retrieved from the buyer database 500 during step 1250. Thereafter, the buyer identification number is transmitted to each seller who accepted a component CPO during step 1255. The package CPO monitoring process 1200 transmits the merchant identifier of the package CPO management system 100, together with the buyer's credit card account number, a billing descriptor and the purchase amount for the package CPO to the credit card issuer for payment authorization during step 1260, via a conventional credit card authorization network.

The status field 725 of the package CPO database 700 is updated during step 1265 to indicate that the respective package CPO was completed, before program control terminates during step 1270.

If, however, it was determined during step 1205 that all of the component CPOs within a given package CPO have not been pre-bound at currently posted prices, then the expiration date of the package CPO is retrieved from field 760 of the package CPO database 700 during step 1210 (FIG. 12*b*). A test is then performed during step 1215 to determine if the package CPO has expired. If it is determined during step 1215 that the package CPO has expired, without each component being pre-bound, then the package CPO monitoring process 1200 communicates (1) termination of any pre-bind agreements for component CPOs within the expired package CPO which were accepted by one or more sellers to the respective sellers during step 1235; and (11) expiration of the package CPO to the respective buyer during step 1240. In an alternate embodiment, the buyer can be invited to resubmit a revised package CPO if the original package CPO is not accepted. In addition, the package CPO management system 100 might attempt to compile a counteroffer for the buyer, based on acceptances of individual components received by the package CPO management system 100. Thereafter, program control terminates during step 1245.

If, however, it is determined during step 1215 that the package CPO has not expired, then the package CPO monitoring process 1200 will adjust the status field 725 of the package CPO database 700 during step 1220 to indicate the percentage of the overall package CPO which is currently pre-bound, for example, by accessing the package CPO database 700 to identify the number of components in the package CPO, and identifying the number of components which are currently pre-bound. Thereafter, the "total posting duration" parameter is retrieved from field 765 of the package CPO database 700 during step 1225, which is then multiplied by the "posting time required for each margin allocation" parameter set forth in field 770.

A test is then performed during step 1230 to determine if the package CPO has been active for the posting time required to allocate additional margin to increase the price of each component CPO which has not yet been pre-bound. If it is determined during step 1230 that the package CPO has not been active for the posting time required to allocate additional margin, then program control returns to step 1205 (FIG. 12*a*) and continues processing in the manner described above. If, however, it is determined during step 1230 that the package CPO has been active for the posting time required to allocate additional margin, then the percent composition of each remaining active component CPO is calculated during step 1275 (FIG. 12*c*) relative to the total price of all remaining active component CPOs.

The "per allocation margin percentage" is then retrieved during step 1280 from field 750 of the package CPO database 700. The amount of margin to be allocated to remaining active component CPOs is then calculated during step 1282 by multiplying the retrieved "per allocation margin percentage" value by "remaining margin" value recorded in field 740 of the package CPO database 700. Thereafter, the allocable margin is applied to each remaining active component CPO in appropriate percentages during step 1284 by multiplying the price percentages of the remaining active component CPOs (as determined during step 1275) by the calculated allocable margin amount.

For example, if one component of a three component package is initially prebound at the originally posted price, and the remaining two components are not bound within the posting time required to allocate additional margin, then the package CPO monitoring process 1200 preferably allocates part of the margin between the two remaining component CPOs. The amount allocated to each component CPO is preferably determined by their respective initially posted prices. Assume in the example discussed above, where a buyer submits an offer for a travel package consisting of air travel, hotel accommodations and a car rental, with a total cost for the package not to exceed one thousand dollars ($1,000.00), that the first component to prebind was the airline tickets at $360. Thus, the package CPO monitoring process 1200 will allocate a portion of the remaining margin to the offer prices for the hotel and car rental component CPOs. In a preferred embodiment, since the hotel component CPO accounts for 62% of the total remaining CPO prices ($333/($333+$207)), the offer price of the hotel component CPO is increased by 62%, or $31, of the money taken from the margin ($50). Likewise, the car rental component CPO offer price would be increased by 38% or $19. If one or more components are again not bound for the posting time required to allocate additional margin, more of the margin is preferably allocated.

Figure 13:
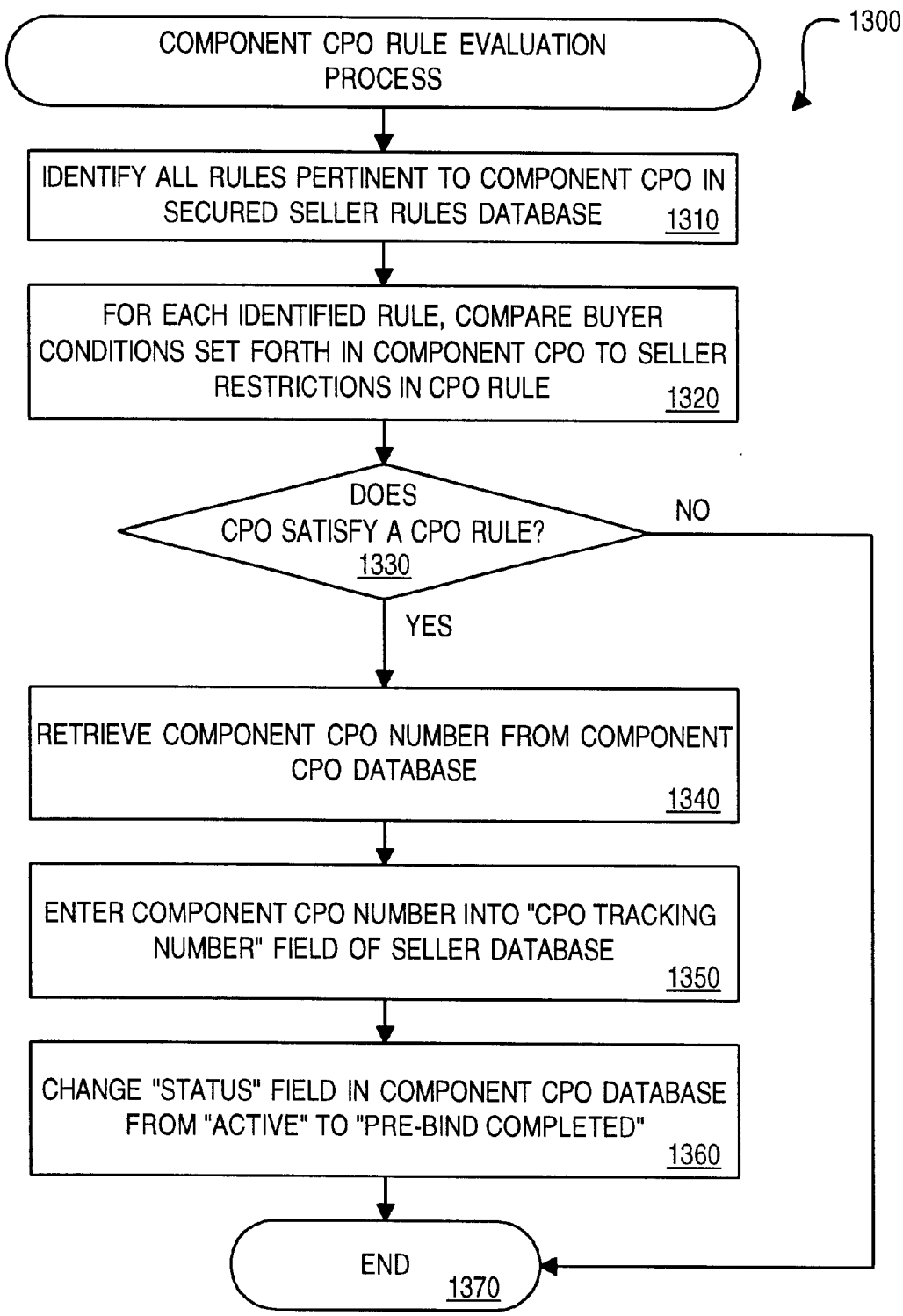
FIG. 13 is a flow chart describing an exemplary component CPO rule evaluation process implemented by the secured server of FIG. 3.

The "remaining margin" recorded in field 740 is adjusted during step 1288 by subtracting the margin allocated in the previous step. Thereafter, during step 1290, the remaining active CPOs with the newly adjusted prices are provided to broadcast-based sellers and the component CPO rule evaluation process 1300 is executed for each appropriate agencybased seller. Finally, program control returns to step 1205 (FIG. 12*a*) and continues processing in the manner described above, until all component CPOs are pre-bound, or until the package CPO expires. In this manner, the offer prices are increased with additional allocated margin for each component CPO that remains unaccepted for each time period required to allocate additional margin. As discussed above, the package CPO posting process 1100 and the package CPO monitoring process 1200 each execute a component CPO rule evaluation process 1300, during steps 1190 and 1290, respectively, for agency-based sellers to compare the component CPOs against the rules of one or more agency-based sellers to generate a response on behalf of the sellers to the given component CPO. An illustrative component CPO rule evaluation process 1300 is shown in FIG. 13. In one embodiment, the component CPO rule evaluation process 1300 is customized for each agency-based seller, so that each evaluation process 1300 receives the component CPO record from the central controller 200 in a standard format for comparison against the rules of the associated seller, and returns a standard response of the seller to the component CPO, such as "accept" or "reject."

As shown in FIG. 13, the component CPO rule evaluation process 1300 initially identifies all CPO rules in the secured seller rules database 1000 which are pertinent to the component CPO during step 1310. Thereafter, during step 1320, the buyer defined conditions from the component CPO record in the component CPO database 800 are then compared to the corresponding seller defined restrictions from the secured seller rules database 1000 during step 1320, for each CPO rule identified during the previous step.

Thereafter, a test is performed during step 1330 to determine if the component CPO satisfies a CPO rule. If it is determined during step 1330 that the component CPO does not satisfy one CPO rule, then program control terminates during step 1370. If, however, it is determined during step 1330 that the component CPO does satisfy a CPO rule, then the component CPO number is retrieved from the component CPO database 800 during step 1340, and then entered into the "CPO tracking number" field 645 of the seller database 600. The status of the component CPO in field 845 of the component CPO database 800 is updated to "pre-bind completed" during step 1360, before program control terminates during step 1370. In addition, a pre-bind expiration date can be added to field 845, if mandated by the seller.

It is to be understood that the embodiments and variations shown and described herein are merely illustrative of the principles of this invention and that various modifications may be implemented by those skilled in the art without departing from the scope and spirit of the invention.

For example, as previously indicated, although the present invention has been illustrated in a travel environment, the package CPO management system 100 could be utilized to sell any packages of any component goods or services, as would be apparent to a person of ordinary skill.

We claim:

1. A method of using a computer to process the sale of a package of component items, comprising the steps of:

obtaining, using said computer, a purchase offer for said package from a customer, said purchase offer containing a description of each component item and a payment identifier for specifying a general-purpose account from which funds may be paid;

deconstructing by said computer said package purchase offer into a plurality of component purchase offers each having a component price;

providing said component purchase offers to a plurality of potential sellers;

receiving from one or more of said sellers an acceptance of said component purchase offers;

binding said customer to purchase said package if an acceptance is received for each of said component purchase offers; and preventing said customer from identifying said component price.

2. The method according to claim 1, further comprising the step of initiating the use of said payment identifier to collect said funds.

3. The method according to claim 1, wherein said component purchase offers are offered at a component price.

4. The method according to claim 1, wherein said purchase offer includes a total price and a portion of said total price is reserved as a margin.

5. The method according to claim 1, further comprising filtering said component purchase offers provided to said sellers based on the industry associated with each component purchase offer and the industry of said sellers.

6. A method of using a computer to process the sale of a package of component items, comprising the steps of:

obtaining, using a computer, a purchase offer for said package from a customer, said purchase offer containing a description of each component item and a payment identifier for specifying a general-purpose account from which funds may be paid;

deconstructing by said computer said package purchase offer into a plurality of component purchase offers each having a component price, and wherein said component price of each component is based on the percentage of the market value of the component item to the market value of the package;

providing said component purchase offers to a plurality of potential sellers;

receiving from one or more of said sellers an acceptance of said component purchase offers; and binding said customer to purchase said package if an acceptance is received for each of said component purchase offers.

7. The method according to claim 1, further comprising the step of entering a preliminary agreement with each seller accepting a component purchase offer, whereby the component item associated with said accepted component purchase offer is reserved for a predefined time period.

8. A method of using a computer to process the sale of a package of component items, comprising the steps of:

obtaining, using said computer, a purchase offer for said package from a customer, said purchase offer containing a description of each component item and a payment identifier for specifying a general-purpose account from which funds may be paid;

deconstructing by said computer said package purchase offer into a plurality of component purchase offers each having a component price;

providing said component purchase offers to a plurality of potential sellers;

increasing the component price of one or more of said component purchase offers that remain unaccepted by said sellers after a predefined time period;

receiving from one or more of said sellers an acceptance of said component purchase offers;

binding said customer to purchase said package if an acceptance is received for each of said component purchase offers.

9. A method of using a computer to process the sale of a package of component items, comprising the steps of:

obtaining, using said computer, a purchase offer for said package from a customer, said purchase offer containing a description of each component item and a payment identifier for specifying a general-purpose account from which funds may be paid;

deconstructing by said computer said package purchase offer into a plurality of component purchase offers;

providing said component purchase offers to a plurality of potential sellers, in a serial order based on the likelihood that each component item of the package will be accepted by a seller;

receiving from one or more of said sellers an acceptance of said component purchase offers; and binding said customer to purchase said package if an acceptance is received for each of said component purchase offers.

10. A method of using a computer to process the sale of a package of component items, comprising the steps of:

obtaining, using said computer, a purchase offer for said package from a customer, said purchase offer containing at least one customer-defined condition for each of said component items and a total price;

deconstructing by said computer said package purchase offer into a plurality of component purchase offers each having a component price;

identifying one or more rules from a plurality of sellers of said component items, each of said rules containing one or more seller-defined restrictions;

comparing one or more of said component purchase offers to said rules to determine whether any of said sellers is willing to accept said component purchase offer if said customer-defined condition satisfies said seller-defined restrictions of at least one of said rules;

providing said package of component items to said customer if each of said component purchase offers is acceptable; and preventing said customer from identifying said component price.

11. The method according to claim 10, wherein said component purchase offers are offered at a component price.

12. The method according to claim 10, further comprising the step of entering a preliminary agreement with each seller accepting a component purchase offer, whereby the component item associated with said accepted component purchase offer is reserved for a predefined time period.

13. The method according to claim 10, wherein said purchase offer includes a total price and a portion of said total price is reserved as a margin.

14. The method according to claim 10, further comprising filtering said component purchase offers provided to said sellers based on the industry associated with each component purchase offer and the industry of said sellers.

15. The method according to claim 10, wherein said component purchase offers are provided to said sellers in a serial order based on the likelihood that each component item of the package will be accepted by a seller.

16. A method of using a computer to process the sale of a package of component items, comprising the steps of:

obtaining, using said computer, a purchase offer for said package from a customer, said purchase offer containing at least one customer-defined condition for each of said component items;

deconstructing by said computer said package purchase offer into a plurality of component purchase offers each having a component price, wherein said component price of each component is based on the percentage of the market value of the component item to the market value of the package;

identifying one or more rules from a plurality of sellers of said component items, said rules containing one or more seller-defined restrictions;

comparing one or more of said component purchase offers to said rules to determine whether any of said sellers is willing to accept said component purchase offer if said customer-defined condition satisfies said seller-defined restrictions of at least one of said rules; and providing said package of component items to said customer if each of said component purchase offers is acceptable.

17. A method of using a computer to process the sale of a package of component items, comprising the steps of:

obtaining, using said computer, a purchase offer for said package from a customer, said purchase offer containing at least one customer-defined condition for each of said component items;

deconstructing by said computer said package purchase offer into a plurality of component purchase offers;

identifying one or more rules from a plurality of sellers of said component items, said rules containing one or more seller-defined restrictions;

comparing one or more of said component purchase offers to said rules to determine whether any of said sellers is willing to accept said component purchase offer if said customer-defined condition satisfies said seller-defined restrictions of at least one of said rules;

increasing the component price of one or more of said component purchase offers that remain unaccepted by said sellers after a predefined time period; and providing said package of component items to said customer if each of said component purchase offers is acceptable.

18. A method of using a computer to process the sale of a package of component items, comprising the steps of:

obtaining, using said computer, a purchase offer for said package from a customer, said purchase offer containing a description of each component item;

deconstructing said package purchase offer into a plurality of component purchase offers;

providing each of said component purchase offers to a plurality of potential sellers;

receiving from one or more of said sellers an acceptance of each of said component purchase offers at a component price; and preventing said customer from identifying said component price.

19. The method according to claim 18, wherein said component purchase offers are offered at a component offer price.

20. The method according to claim 19, wherein said component offer price of each component is based on the percentage of the market value of the component item to the market value of the total package.

21. The method according to claim 19, further comprising the step of increasing the component offer price of one or more of said component purchase offers that remain unaccepted by said sellers after a predefined time period.

22. The method according to claim 18, further comprising the step of entering a preliminary agreement with each seller accepting a component purchase offer, whereby the component item associated with said accepted component purchase offer is reserved for a predefined time period.

23. The method according to claim 18, wherein said purchase offer includes a total price and a portion of said total price is reserved as a margin.

24. The method according to claim 18, further comprising the step of filtering said component purchase offers provided to said sellers based on the industry associated with each component purchase offer and the industry of said sellers.

25. The method according to claim 18, wherein said component purchase offers are provided to said sellers in a serial order based on the likelihood that each component item of the package will be accepted by a seller.

26. A method of using a computer to process the sale of a package of component items, comprising the steps of:

obtaining, using said computer, a purchase offer for said package from a customer, said purchase offer containing at least one customer-defined condition for each of said component items and a total price;

deconstructing by said computer said package purchase offer into a plurality of component purchase offers each having a component price;

providing each of said component purchase offers to a plurality of potential sellers;

receiving from one or more of said sellers an acceptance of each of said component purchase offers at a component price and an identification of a component product satisfying said customer-defined condition;

binding said customer to purchase said package if an acceptance is received for each of said component purchase offers; and preventing said customer from identifying said component price.

27. The method according to claim 26, wherein said component purchase offers are offered at a component price.

28. The method according to claim 26, further comprising the step of entering a preliminary agreement with each seller accepting a component purchase offer, whereby the component item associated with said accepted component purchase offer is reserved for a predefined time period.

29. The method according to claim 26, wherein a portion of said total price is reserved as a margin.

30. The method according to claim 26, further comprising the step of filtering said component purchase offers provided to said sellers based on the industry associated with each component purchase offer and the industry of said sellers.

31. A method of using a computer to process the sale of a package of component items, comprising the steps of:

obtaining, using said computer, a purchase offer for said package from a customer, said purchase offer containing at least one customer-defined condition for each of said component items and a total price;

deconstructing by said computer said package purchase offer into a plurality of component purchase offers each having a component price, and wherein said component price of each component is based on the percentage of the market value of the component item to the market value of the package;

providing each of said component purchase offers to a plurality of potential sellers;

receiving from one or more of said sellers an acceptance of each of said component purchase offers at a component price and an identification of a component product satisfying said customer-defined condition; and binding said customer to purchase said package if an acceptance is received for each of said component purchase offers.

32. A method of using a computer to process the sale of a package of component items, comprising the steps of:

obtaining, using said computer, a purchase offer for said package from a customer, said purchase offer containing at least one customer-defined condition for each of said component items and a total price;

deconstructing by said computer said package purchase offer into a plurality of component purchase offers each having a component price;

providing each of said component purchase offers to a plurality of potential sellers;

increasing the component price of one or more of said component purchase offers that remain unaccepted by said sellers after a predefined time period;

receiving from one or more of said sellers an acceptance of each of said component purchase offers at a component price and an identification of a component product satisfying said customer-defined condition; and binding said customer to purchase said package if an acceptance is received for each of said component purchase offers.

33. A method of using a computer to process the sale of a package of component items, comprising the steps of:

obtaining, using said computer, a purchase offer for said package from a customer, said purchase offer containing at least one customer-defined condition for each of said component items and a total price;

deconstructing by said computer said package purchase offer into a plurality of component purchase offers;

providing each of said component purchase offers to a plurality of potential sellers in a serial order based on the likelihood that each component item of the package will be accepted by a seller;

receiving from one or more of said sellers an acceptance of each of said component purchase offers at a component price and an identification of a component product satisfying said customer-defined condition; and binding said customer to purchase said package if an acceptance is received for each of said component purchase offers.

34. A system for processing the sale of a package of component items comprising:

a communications port to receive a purchase offer for said package from a customer, said purchase offer containing a description of each component item and a payment identifier for specifying a general-purpose account from which funds may be paid; and a processor to (1) deconstruct said package purchase offer into a plurality of component purchase offers including component prices, (2) determine if each of said component purchase offers are accepted by one or more potential sellers and thereby bind customer to purchase said package if an acceptance is received for each of said component purchase offers, and (3) prevent said customer from identifying said component prices.

35. A system for processing the sale of a package of component items comprising:

a communications port for obtaining a purchase offer for said package from a customer and for obtaining one or more rules from a plurality of sellers of said component items, said purchase offer containing at least one customer-defined condition for each of said component items and each of said rules containing one or more seller-defined restrictions; and a processor to:

deconstruct said package purchase offer into a plurality of component purchase offers each having a component price;

compare one or more of said component purchase offers to said rules to determine whether any of said sellers is willing to accept said component purchase offer if said customer-defined condition satisfies said seller-defined restrictions of at least one of said rules;

provide said package of component items to said customer if each of said component purchase offers is acceptable; and prevent said customer from identifying said component price.

36. A method of using a computer to process the sale of a package of component items, comprising:

obtaining, using a computer, a package purchase offer from a customer, said package purchase offer containing a description of each component items, at least one customer-defined condition for each component item, a total price and a payment identifier for specifying a general-purpose account from which funds may be paid;

identifying one or more rules from a plurality of sellers of said component items, each of said rules containing one or more seller-defined restrictions;

comparing said package purchase offer to said rules to determine whether said sellers are willing to accept components of said package purchase offer if said customer-defined condition satisfies said seller-defined restrictions of at least one of said rules;

binding said customer to purchase said package if each component of said package purchase offer is acceptable is acceptable; and preventing said customer from identifying component prices.

37. The method of claim 36 further comprising deconstructing said package purchase offer into a plurality of component purchase offers.

38. A system for processing the sale of a package of component items, comprising:

a memory device; and a processor disposed in communication with said memory device, said processor configured to:

obtain a package purchase offer from a customer, said package purchase offer containing a description of each component item, at least one customer-defined condition for each component item, a total price and a payment identifier for specifying a general-purpose account from which funds may be paid;

identify one or more rules from a plurality of sellers of said component items, each of said rules containing one or more seller-defined restrictions;

compare said package purchase offer to said rules to determine whether said sellers are willing to accept components of said package purchase offer if said customer-defined condition satisfies said seller-defined restrictions of at least one of said rules;

bind said customer to purchase said package if each component of said package purchase offer is acceptable; and prevent said customer from identifying component prices of said component items.

39. The system of claim 38 wherein said processor is further configured to deconstruct said package purchase offer into a plurality of component purchase offers.

40. A system for processing the sale of a package of component items, comprising:

means for obtaining a package purchase offer from a customer, said package purchase offer containing a description of each component item, at least one customer-defined condition for each component item, a total price and a payment identifier for specifying a general-purpose account from which funds may be paid;

means for identifying one or more rules from a plurality of sellers of said component items, each of said rules containing one or more seller-defined restrictions;

means for comparing said package purchase offer to said rules to determine whether said sellers are willing to accept components of said purchase offer if said customer-defined condition satisfies said seller-defined restrictions of at least one of said rules;

means for binding said customer to purchase said package if each component of said package purchase offer is acceptable; and means for preventing said customer from identifying component prices of said components.

41. The system of claim 40 further comprising means for deconstructing said package purchase offer into a plurality of component purchase offers.

* * * * *